US012749066B2

(12) United States Patent
Mutha

(10) Patent No.: US 12,749,066 B2
(45) Date of Patent: Sep. 29, 2026

(54) MULTIPLEXING-BASED VALIDATION VIA A PROXY CARD AT A TERMINAL DEVICE

(71) Applicant: Aurus, Boston, MA (US)

(72) Inventor: Rahul Mutha, Norwood, MA (US)

( * ) Notice: Subject to any disclaimer, the term of this patent is extended or adjusted under 35 U.S.C. 154(b) by 0 days.

(21) Appl. No.: 19/064,177

(22) Filed: Feb. 26, 2025

(65) Prior Publication Data

US 2025/0200554 A1 Jun. 19, 2025

Related U.S. Application Data

(63) Continuation of application No. 18/368,107, filed on Sep. 14, 2023, now Pat. No. 12,254,460.

(60) Provisional application No. 63/462,766, filed on Apr. 28, 2023.

(51) Int. Cl.
*G06Q 20/34* (2012.01)
*G06Q 20/20* (2012.01)

(52) U.S. Cl.
CPC ........... *G06Q 20/341* (2013.01); *G06Q 20/20* (2013.01)

(58) Field of Classification Search
CPC .. G06Q 20/341; G06Q 20/20; G06Q 20/3274; G06Q 20/401; G06Q 20/352; G07F 7/0873; G07F 7/12
See application file for complete search history.

(56) References Cited

U.S. PATENT DOCUMENTS 10,810,473 B1 * 10/2020 Joseph .................. G06K 13/14
2006/0267611 A1 11/2006 Corcoran et al.
2010/0038424 A1 2/2010 Bashan et al.
2018/0253572 A1 9/2018 Ryan
2019/0065792 A1 2/2019 Fenton et al.
2019/0266584 A1 * 8/2019 Walters .................. G01R 27/28

OTHER PUBLICATIONS

International Search Report on PCT/US2024/026647 dated Jul. 8, 2024.
Non-Final Office Action on U.S. Appl. No. 18/368,107 DTD Jul. 17, 2024.
Notice of Allowance on U.S. Appl. No. 18/368,107 DTD Nov. 18, 2024.
Notice of Allowance on U.S. Appl. No. 18/589,347 DTD Apr. 30, 2024.

* cited by examiner

*Primary Examiner* — Matthew Mikels
(74) *Attorney, Agent, or Firm* — Foley & Lardner LLP

(57) ABSTRACT

Automated testing and validation of integrated circuit cards for point of sale transactions is provided. A microcontroller can receive, via an automation script executed by a point of sale device, an instruction to select a slot in a card stack. The microcontroller can activate, responsive to the instruction, the slot to establish an electrical connection between an integrated circuit card in the slot and a proxy card in a terminal device. The microcontroller can receive, subsequent to initiation of a synthetic transaction, an indication that the synthetic transaction is complete. The microcontroller can deactivate, subsequent to receipt of the indication that the synthetic transaction is complete, the slot to terminate the electrical connection between the integrated circuit card in the slot and the proxy card to cause the terminal device to detect a card removal event without physical removal of the proxy card.

20 Claims, 17 Drawing Sheets

500

1200

1500

MULTIPLEXING-BASED VALIDATION VIA A PROXY CARD AT A TERMINAL DEVICE

CROSS-REFERENCE TO RELATED APPLICATION

This application claims the benefit of priority under 35 U.S.C. § 120 to U.S. Non-Provisional patent application Ser. No. 18/368,107, filed Sep. 14, 2023, which claims the benefit of priority under 35 U.S.C. § 119 to U.S. Provisional Patent Application No. 63/462,766, filed Apr. 28, 2023, both of which are incorporated herein by reference in their entirety and for all purposes.

TECHNICAL FIELD

The present disclosure relates generally testing and validation of integrated circuit (IC) cards, and more particularly, to systems and methods for testing and validation of IC cards for conducting electronic transactions.

BACKGROUND

Exchange of data during an electronic transaction implemented via a payment terminal system can utilize integrated circuits cards. However, due to the different types and configurations of integrated circuit cards and their payment transaction capabilities, it can be challenging to efficiently and reliably develop terminals and software capable of accurately conducting electronic transactions without errors, bugs, or excess computing or network resource utilization.

SUMMARY

Testing and validation of transaction features, such as integrated circuits (IC) cards or quick response (QR) codes, used in the point of sale (POS) transactions can be challenging due to a range of design variations, both on the side of the transaction features (e.g., IC cards or QR codes) and the side of the terminal devices with such transaction features can be coupled. As transaction features can be used to access user data that the POS system uses to complete the transaction, it can be important to verify that the transaction features operate correctly and consistently across the range of design variations. Testing and verification can cover the contact transactions (e.g., IC cards with chip contacts) as well as contactless transactions, such as transactions in which IC cards utilize a magnetic strip or a near-field communication (NFC) antenna (e.g., wireless transaction). Using robots to handle transaction features during the testing process may result into a number of moving mechanical parts, resulting into several points of failure, as well as an excessive energy consumption. The present solution overcomes such challenges by allowing for efficient and automated validation and testing of the transaction features without the introduction of mechanical moving parts or excessive energy consumption. For instance, the present solution can include a set of IC cards engaged with a testing system and a microcontroller to select IC cards and establish signal communication between the selected IC cards and a proxy card coupled with the payment terminal device. A payment transaction request can be initiated from an automation script at the point of sale device with a specific transaction data (e.g., amount) to be used to select a specific card. The script can validate a payment request and interact with the payment terminal to use transaction amount to determine which IC card of the multiple IC cards to select. The script can send a card selection instruction to the microcontroller before a transaction request is transmitted to the payment terminal, completing the card selection and making the IC card available for payment terminal to process the payment request.

At least one aspect of the present disclosure is directed to a system. The system can be a system to validate integrated circuits cards. The system can include a microcontroller comprising processor circuitry and memory. The processor circuitry and memory of the system can receive, via an automation script executed by a point of sale device, an instruction to select a slot of a plurality of slots in a card stack. The processor circuitry and memory can activate, responsive to the instruction, the slot to establish an electrical connection between an integrated circuit card in the slot and a proxy card in a terminal device. The processor circuitry and memory can receive, subsequent to initiation by the automation script of a synthetic transaction with the integrated circuit card in the card stack via the proxy card in the terminal device, an indication that the synthetic transaction is complete. The processor circuitry and memory can deactivate, subsequent to receipt of the indication that the synthetic transaction is complete, the slot to terminate the electrical connection between the integrated circuit card in the slot of the card stack and the proxy card in the terminal device to cause the terminal device to detect a card removal event without physical removal of the proxy card.

At least one aspect of the present disclosure is directed to a method. The method can include receiving, by a microcontroller comprising processor circuitry and memory, via an automation script executed by a point of sale device, an instruction. The instruction can be an instruction to select a slot of a plurality of slots in a card stack. The method can include activating, by the microcontroller responsive to the instruction, the slot to establish an electrical connection between an integrated circuit card in the slot and a proxy card in a terminal device. The method can include receiving, by the microcontroller subsequent to initiation by the automation script of a synthetic transaction with the integrated circuit card in the card stack via the proxy card in the terminal device, an indication that the synthetic transaction is complete. The method can include deactivating, by the microcontroller subsequent to receiving the indication that the synthetic transaction is complete, the slot to terminate the electrical connection between the integrated circuit card in the slot of the card stack and the proxy card in the terminal device to cause the terminal device to detect a card removal event without physical removal of the proxy card.

At least one aspect of the present disclosure is related to non-transitory computer-readable medium storing processor-executable instructions. The instructions can be such that, when executed by one or more processors, cause the one or more processors to establish a communication session with a terminal device connected to a proxy card, the proxy card in electrical connection with a microcontroller. When executed, the instructions can cause the one or more processors to transmit, to the terminal device, a request for a synthetic transaction to cause the terminal device to process the request for the synthetic transaction via the proxy card in the terminal device. When executed, the instructions can cause the one or more processors to transmit, to the microcontroller, an instruction to activate a slot of a plurality of slots of a card stack subsequent to transmission of the request for the synthetic transaction to the terminal device, the slot comprising an integrated circuit card. When executed, the instructions can cause the one or more processors to transmit, subsequent to completion of the synthetic transaction with the integrated circuit card in the card stack via the proxy card in the terminal device, an indication to the microcontroller that the synthetic transaction is complete to cause i) the microcontroller to deactivate the slot, and ii) the terminal device to detect a card removal event without physical removal of the proxy card.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
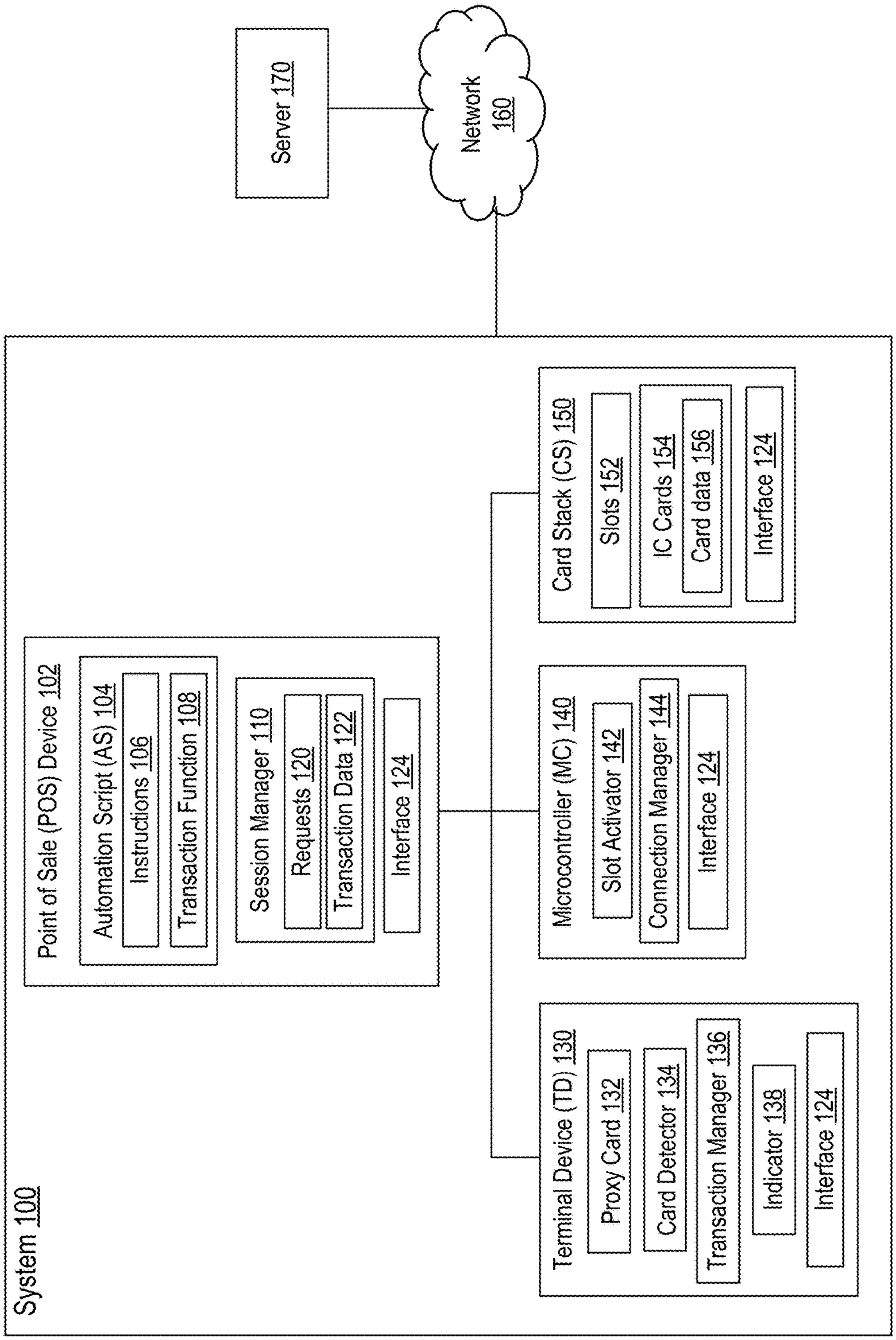
FIG. 1 illustrates an example of a system for multiplexing-based validation via a proxy card at a terminal device.

Following below are more detailed descriptions of various concepts related to, and implementations of, methods, apparatuses, and systems of multiplexing-based validation via a proxy card at a terminal device. The various concepts introduced above and discussed in greater detail below may be implemented in any of numerous ways.

Testing and validation of integrated circuits (IC) cards used in the point of sale (POS) transactions can be challenging due to a range of design variations, both on the side of the IC cards and the side of the terminal devices with which the IC cards can be coupled. As IC cards can be used to access user data that the POS system uses to complete the transaction, it can be important to verify that the IC cards operate correctly and consistently across the range of design variations and transaction interfaces. Various transaction interfaces for the IC cards can include contact interfaces, such as for example an IC card chip, and contactless interfaces, such as for example magnetic strips and NFC antennas (e.g., wireless interfaces).

Development of point of sale and payment solutions can include iterative integration and validation of IC cards prior to payment card industry (PCI) certification and market release. The testing phase of such development efforts can include validation IC card performance and operation to verify that different IC cards perform as expected under various conditions, including for example, different terminal devices, card issuers, card types, transaction interfaces and verification techniques, such as the signature or pin verifications. Using robots to handle IC cards during the testing process can lead to numerous moving parts resulting into multiple points of failure, as well as excessive energy consumption.

The present solution overcomes these challenges by providing a solution for automated testing point of sale IC cards, while eliminating mechanical moving parts and points of failure and conserving energy. The present solution allows for automated validation of integrated circuit (IC) cards at a payment terminal during testing. The solution can include a set of IC cards engaged with a testing system and a microcontroller to enable or disable selected IC cards to be tested, in order to establish signal communication between the selected IC cards and a proxy card coupled with the payment terminal device. A payment transaction request can be initiated from an automation script at the point of sale device with a specific transaction data (e.g., amount) to be used to select a specific card. The script can validate a payment request and interact with the payment terminal to use transaction amount to determine which IC card of the multiple IC cards to select. The script can send a card selection instruction to the microcontroller before a transaction request is transmitted to the payment terminal, completing the card selection and making the IC card available for payment terminal to process the payment request. The payment can be processed using any transaction interface, such as for example, a contact interface (e.g., IC card chip)

or contactless or wireless interface, such as NFC antenna on the IC card or a magnetic strip on the IC card.

FIG. 1 depicts is an example of a system 100 for testing and validation of IC cards 154 used in various payment transactions. System 100 can include one or more point of sale (POS) devices 102, terminal devices (TDs) 130, micro-controllers (MCs) 140 and card stacks (CS) 150. A POS device 102 can include one or more automation scripts (ASs) 104 that can include or operate one or more transaction functions 108 and include or issue one or more instructions 106. A POS device 102 can include one or more interfaces 124 and session managers 110 that can include or issue one or more requests 120 along with transaction data 122. A TD 130 can include one or more proxy cards 132, card detectors 134, transaction managers 136, indicators 138 and interfaces 124. An MC 140 can include one or more slot activators 142, connection managers 144 and interfaces 124. A CS 150 can include one or more slots 152, interfaces 124 and IC cards 154 that can include card data 156. Each one of the POS devices 102, TDs 130, MCs 140 and CSs 150 can be communicatively coupled with each other and exchange communication and/or data via their respective interfaces 124 (e.g., such as via network 160). Various components of the system 100 (e.g., TD 130) can communicate with a remote server 170 to process payment transactions, via a network 160, which can be internal or external to the system 100.

In an example, a system 100 for automated testing and validation of IC cards can include, for example, a POS device 102 that can initiate a payment transaction request 120 using or including transaction data 122, such as for example a transaction amount, IC card type or identifier. An AS 104 can confirm transaction request 120 contents (e.g., parameters) and can send instruction to a MC 140 for selection of an IC card 154 at the card stack 150 prior to sending request 120 to a TD 130. The AS 104 can use the transaction data 122 (e.g., transaction amount, card identifier or type) to determine which card 154 at which slot 152 of the CS 150 to select for testing and validation by implementing a synthetic payment, such as by using card data 156. The MC 140 can interact with the card stack 150 to activate the selected IC card 154 to process the synthetic payment. The AS 104 can send transaction request 120 to a communication interface 124, which can send the request further to a TD 130 to process the synthetic payment using a proxy card 132 inserted into, or integrated with, the TD 130. A communication path between the proxy card 132 and the selected IC card 154 can be established by the MC 140 to allow the TD 130 to interact with the selected IC card 154 and use the IC card 154 as if it were the proxy card 132 coupled with the TD 130. Once the communication between the proxy card 132 and the IC card 154 is established, the transaction manager 136 can implement the synthetic transaction using the IC card 154 and the proxy card 132. Once TD 130 completes interaction with selected IC card 154, TD 130 can continue transaction processing with a remote server 170 to complete the payment transaction. Once transaction confirmation is received on TD 130, TD 130 can send the details of the transaction back to the POS device 102, via their respective application interfaces 124. Testing of each IC card 154 at the CS 150 can continue automatically and iteratively using automation script 104 to initiate and send payment requests 120 with transaction data 122 for various IC cards 154, resulting in different IC cards 154 being selected for the testing and validation until all slots 152 with IC cards 154 at the CS 150 are completed. Once completed, the slots 152 can be repopulated or replenished with new set of IC cards 154 to test and validate and the whole process can be repeated again for the new set of IC cards 154.

System 100 can include any combination of hardware and software for automated testing and validation of IC cards 154. System 100 can include any one or more POS devices 102, TDs 130, MCs 140 and CSs 150 that can be used for testing of IC cards 154 via synthetic transactions processed using one or more IC cards 154 and proxy cards 132. A synthetic transaction can include any test transaction processed by the system 100 to test or validate an IC card 154. For example, a synthetic transaction can include a transaction test to select and test a particular IC card 154 at a CS 150 using a proxy card 132 coupled with a TD 130. System 100 can include system components (e.g., POS device 102, TD 130, MC 140 and/or CS 150) that are separate from each other or integrated into a single structure, standalone system or a device.

An integrated circuit (IC) card 154 can include any device, system, circuitry or a combination of hardware and software for storing or providing information or data to a TD 130 to implement or complete a transaction (e.g., a valid purchase transaction or a synthetic transaction). IC card 154 can include one or more transaction interfaces for completing transactions. For example, an IC card 154 can include a magnetic strip card, having a piece of plastic (or other material) along with a magnetic strip storing information or data to validate the transaction (e.g., by providing access to a user's account). For example, an IC card 154 can include a chip card technology, which can include circuitry, such as a microprocessor, along with memory storing information. IC card 154 with a chip can include a chip-and-pin card, or an Europay, MasterCard and Visa (EMV) card. For example, an IC card 154 can include circuitry and/or functions for contactless or wireless payment transactions, such as for example, radio frequency identification (RFID) circuitry and/or data for a near-field communication (NFC). For instance, IC card 154 can include NFC circuitry and/or functions for transfer of information, including user data (e.g., bank or other account information) to facilitate a transaction, such as a synthetic transaction. IC card 154 can include a debit card, a credit card, a gift card, a wireless or a contactless transaction circuitry device, such as an NFC transaction circuitry or a device. IC card 154 can include application functions for communicating user data with a TD 130.

Card stack (CS) 150 can include any combination of hardware and software for providing IC cards 154 for synthetic transactions. CS 150 can include mechanical structure providing slots 152 for holding or coupling with IC cards 154. A slot 152 can include a slot, a location or a contact with which an individual IC cards 154 can couple or connect. Slot 152 can include a holder, an adapter or a connector for an IC card 154 to allow the IC card 154 to connect to the CS 150 and communicate, via interface 124 of the CS 150 with an interface 124 of the TD 130, MC 140 and/or POS device 102. CS 150 can hold or connect to any number of IC cards 154, such as 10, 20, 50, 100, 1000, or 10000 IC cards 154. CS 150 can include an array of card stacks 150 that can be interconnected to function as a single CS 150 to provide access to a larger number of IC cards 154.

CS 150 can include a multiplexer (MUX) for selecting IC cards 154 and/or slots 152. For example, a CS 150 can include a MUX for selecting slots 152 and/or IC cards 154, based on the MC 140 instructions, such as instructions from MC 140 or a slot activator 142. MUX can interface with a storage device 225 to select particular memory locations in the storage device, where each of the particular memory locations corresponds to a particular IC cards 154 being tested.

Card data 156 can include any information of an ID card 154. For example, card data 156 can include a card identifier for uniquely identifying an ID card 154 among a plurality of ID cards 154. A card identifier can include, for example, an alphanumeric information or value uniquely identifying an IC card 154 from a plurality of IC cards 154 at a CS 150. Card data 156 can include information or data on type of IC card 154, type of technology (e.g., transaction interface) provided by the IC card 154 (e.g., NFC technology, magnetic strip or chip technology). Card data 156 can include metadata on the make and model of IC card 154, version of technology utilized and any other information on the IC card 154.

Point of sale (POS) device 102 can include any system, circuitry, device, or a combination of hardware and software for processing transactions by customers or purchasers, such as retail customers or purchasers. A POS device 102 can include a cash register at a retail store or a function for processing transactions on a network device (e.g., an application server or cloud). For instance, a POS device 102 can include a cloud-based system that can be communicatively coupled with a TD 130 to utilize a card (e.g., an IC card 154 or proxy card 132) at the TD 130 to complete a transaction. POS device 102 can utilize a session manager 110 to establish and manage sessions for communicating with other system 100 components, such as TD 130, MC 140 and/or CS 150. POS device 102 can communicate with a TD 130, MC 140 and/or CS 150 to complete a synthetic transaction for any number of IC cards 154 using any number of automation scripts 104 to perform any number of synthetic transactions via any number of IC cards 154 and via one or more proxy cards 132.

Automation script (AS) 104 can include any combination of hardware and software for automated testing of IC cards 154 by the system 100. An AS 104 can include commands, computer code, data and/or instructions 106 for implementing a synthetic transaction. An AS 104 can instruct a TD 130 to use an IC card 154 at a CS 150 to process a transaction using a proxy card 132. For example, AS 104 can instruct the TD 130 to utilize circuitry and data at IC card 154 to process a transaction at TD 130 utilizing proxy card 132 to trigger the card detector 134 to detect the presence of a card (e.g., proxy card 132) at the TD 130 and allow processing of the transaction. AS 104 can include series of instructions 106, along with any data and parameters to instruct TD 130 to complete a synthetic transaction via an MC 140.

Instructions 106 can include any commands, instructions, data, configurations or settings for implementing automated testing of IC cards 154. Instruction 106 can include a command, instruction, data or settings for a MC 140 and/or TD 130 to initiate or implement a synthetic transaction, or a portion of a synthetic transaction, access a particular IC card 154 at a particular slot 152. For example, a portion of a synthetic transaction can include an act out of a plurality of acts in a transaction, such as select an ID card 154, activate or deactivate a slot 142 with a particular IC card 154, or establish a connection between a slot 152 and/or a particular IC card 154 and the TD 130. Instruction 106 can include card data 156 identifying an IC card 154 and/or data identifying a slot 152 or instructing a TD 130 to establish a connection or session with a card stack 150

Transaction function 108 can include any function for initiating, triggering, providing or otherwise implementing a transaction (e.g., a synthetic transaction) using one or more IC cards 154 and proxy cards 132. Transaction function 108 can keep track of synthetic transactions being implemented, completed, queued or planned. Transaction function 108 can utilize AS 104 and/or instructions 106, as well as session manager 110 and/or requests 120 with transaction data 122 to implement synthetic transactions. Transaction function 108 can manage synthetic transactions in iterative fashion or in parallel. For example, transaction function 108 can manage multiple IC cards 154 being tested via multiple simultaneous synthetic transactions via a TD 130.

Session manager 110 can include any combination of hardware and software for establishing, controlling or managing sessions between devices of system 100, such as POS device 102, TD 130, MC 140 and CS 150. Session manager 110 can establish and implement sessions between POS device 102 and a TD 130. For example, a session manager can establish a first communication session between POS device 102 and a TD 130 for a first synthetic transaction and a second communication session between POS device 102 and TD 130 for a second synthetic transaction. Session manager 110 can issue and/or send requests 120 to initiate sessions for one or more synthetic transactions.

Requests 120 can include any requests to implement a synthetic transaction by the system 100. For instance, a synthetic transaction can include any test transaction to be processed by system 100 to test or validate an IC card 154 using a proxy card 132. Request 120 can include a request to trigger or initiate a communication between TD 130 and CS 150. Request 120 can include a request to initiate a synthetic transaction for a plurality of IC cards 154, such as all IC cards 154 at a CS 150. The request 120 can initiate any number of sessions between any components of the system 100 to test and/or validate one or more (e.g., all) IC cards 154 at a CS 150.

Transaction data 122 can include any information or data pertaining to the synthetic transaction. Transaction data 122 can include a transaction amount, such as an amount of value or a purchase amount to be transacted via the transaction. Transaction data 122 can include information or data on the type of transaction to be performed, or a type of transaction interface to use, such as a transaction to be performed via a contactless NFC, chip-technology or a magnetic stripe. Transaction data 122 can include information about the IC card 154 to be used, such as a debit card, credit card, a gift card or any other IC card 154 to be used.

Interface 124, also referred to as communication interface 124 or network interface 124, can include any hardware, software or a combination of hardware and software for interfacing or communication between components of a system 100 (e.g., POS device 102, TD 130, MC 140 and/or CS 150) as well as with a server 170. Interface 124 can include logic, circuitry, devices, computer code and scripts for establishing and implementing communications (e.g., sessions or communications). Interface 124 can communicate or exchange data via a fiber, a wireline or a cable, or via a wireless link or a connection, such as a cellular connection (e.g., via a 4G or a 5G cellular network), a Wi-Fi connection or a Bluetooth connection. Interface 124 can include any circuitry or instructions for communicating via a network 160, which can be internal or external to the system 100. Interface 124 can include any computer or a digital system interface for digital communication or interaction between different network devices, such as a modem or a network communication card. Interface 124 can include a web browser interface, a graphical user interface, a menu interface, a form based interface or a natural language interface via which devices (or users) can receive and send data.

Terminal device (TD) 130 can include any combination of hardware and software for implementing or processing transactions of a point of sale system. TD 130 can include a terminal machine or a device that can read magnetic strips or circuity signals from IC cards 154 (e.g., credit cards, debit cards, NFC payment devices). TD 130 can include the functionality to implement and complete payment transactions with remote systems, such as servers 170 across a network 160. TD 130 can include card detector 134 to detect proxy card 132 present or coupled with the TD 130 to allow the transaction to proceed. TD 130 can utilize the transaction manager 136 to manage the implementation or completion of the synthetic transaction, and communication with IC card 154 at a CS 150 and/or server 170 via network 160. TD 130 can include or be integrated together with the POS device 102, MC 140 and/or CS 150.

Proxy card 132 can include any device, system, circuitry or a combination of hardware and software coupled with the TD 130 to indicate to the TD 130 that a functional IC card 154 is coupled with TD 130. Proxy card 132 can include a card that does not include circuitry for processing a synthetic transaction. Proxy card 132 can include any circuitry or device for enabling, allowing or otherwise facilitating a transaction using any transaction interface, including for example a chip interface, a magnetic strip interface or an NFC (e.g., wireless) interface. For example, proxy card 132 can be different from the IC card 154. For instance, proxy card 132 can omit or exclude a chip or processor with data and/or application for communication with a TD 130. For example, a proxy card can include a proxy magnetic strip to allow a magnetic coil to provide the resulting transaction signal for the testing purposes. For example, a proxy card 143 can include an NFC circuit or a device to allow detection of a presence of a proxy card 132, while the IC card 154 used for the transaction is located remotely (e.g., at the other end of the test device or in another location). Proxy card 132 can include circuitry or structure for a card detector 134 to detect an IC card 154 coupled with the TD 130 (e.g., instead of the proxy card 132). Proxy card 132 can include features or circuitry to provide card detector 134 with information or data that IC card 154 is coupled with the TD 130. Proxy card 132 can include functionality to relay to the TD 130 information corresponding to the IC card 154, thereby causing the card detector 134 of the TD 130 to determine that IC card 154 is coupled with the TD 130 instead of the proxy card 132.

Card detector 134 can include any device, circuitry or a combination of hardware and software for detecting a card (e.g., proxy card 132 or IC card 154) coupled with the TD 130. Card detector 134 can include an NFC feature or device, an optical feature or a device or physical switch for detecting presence of, or communicating with, a proxy card 132. Card detector 134 can include the functionality to determine if a proxy card 132 and/or IC card 154 is coupled with the TD 130. Card detector 134 can include features or structures for bypassing detection of a proxy card 132. For example, card detector 134 can include features or structures of the proxy card 132 (e.g., chips, circuits, magnetic stripes, NFC antennas or other devices) to detect presence of the proxy card or otherwise to cause the card detector 134 to determine that proxy card 132 or IC card 154 is coupled with the card detector 134 and/or TD 130.

Transaction manager 136 can include any combination of hardware and software for implementing, completing and managing transactions (e.g., synthetic transactions) by the TD 130. Transaction manager 136 can include the functionality to implement a payment transaction with a server 170 of a third party enterprise (e.g., server for completing sale transactions of a retailer). Transaction manager 136 can implement synthetic transaction per instructions 106. Transaction manager 136 can implement synthetic transaction according to the transaction data 122. Transaction manager can communicate with a remote server 170 and/or cloud-based transaction services of a merchant, a credit card or a banking service to complete the transaction.

Transaction manager 136 can detect, determine or track events, such as card insertion events and card removal events. Transaction manager 136 can determine or detect a card insertion event in response to detecting that there is a connection between the IC card 154 at a slot 152 of the CS 150 and a TD 130. For example, transaction manager 136 can detect a card insertion event in response to determining that an electrical connection (e.g., electrical signal communication) exists between an IC card 154 at CS 150 and a proxy card 132 at the TD 130. Transaction manager 136 can determine or detect a card removal event in response to detecting that a connection between the IC card 154 at a slot 152 of the CS 150 and a TD 130 is no longer present or is terminated. For example, transaction manager 136 can detect a card removal event in response to determining that an electrical connection (e.g., electrical signal communication) that had existed no longer exists between an IC card 154 at CS 150 and a proxy card 132 at the TD 130.

Indicator 138 can include any combination of hardware and software for providing indications. For example, indicator 138 can generate, issue or provide an indication that a synthetic transaction has commenced, is in progress or has completed. Indicator 138 can provide indications of the stage of the synthetic transaction, process implemented, error data or signal feedback.

Microcontroller (MC) 140 can include any device, circuitry, processor or a controller (e.g., microcontroller 140) for selecting slots 152 to activate and connect with the TD 130. MC 140 can include any functionality for establishing, maintaining, managing or providing a connection, session or communication between TD 130 and/or proxy card 132 and an IC card 154 at a CS 150. MC 140 can be internal to POS 102, TD 130, MC 140 and/or CS 150. MC 140 can include functionality for selecting a slot 152 corresponding to a particular IC card 154 to access for processing of a synthetic transaction. MC 140 can include a list or data corresponding various slots 152 to their corresponding IC cards 154. MC 140 can select, activate or deactivate slots 152 according to transaction data 122. MC 140 can establish and manage connections between POS device 102, CS 150 and TD 130. Depending on the design, the MC 140 may or may not participate in the communication between terminal device 130 and selected IC card 154. Depending on the design, the communication can be carried on between the TD 130 and the IC card 154 directly, or via the MC 140.

Slot activator 142 can include any combination of hardware and software for activating or allowing a card 154 to be used by TD 130 to complete a synthetic transaction. Slot activator 142 can include functionality for selecting a slot 152 at a CS 150. Slot activator 142 can select a slot 152 based on or using transaction data 122. Slot activator 142 can include the functionality to activate the slot 152 at the start of the synthetic transaction and deactivate the slot 152 when synthetic transaction is completed.

Connection manager 144 can include any combination of hardware and software for establishing, maintaining and otherwise providing a connection between an IC card 154 at a CS 150 and a TD 130 and/or proxy card 132. Connection manager 144 can include the functionality for establishing and/or maintaining connections between the TD 130 and CS 150. For example, connection manager 144 can establish a connection between a TD 130 and a particular IC card 154. Connection manager 144 can establish connections according to requests 120 and/or transaction data 122.

Network 160 can include any type of communication network, such as a worldwide network and/or a local area network (LAN). Network 160 can include a wireless network or a network of physically coupled network components or devices. Network 160 can include interconnected network devices (e.g., servers, routers, switches) and/or network components via a cloud. Network 160 can allow for communicating via network communication protocols, such as the transmission control protocol/internet protocol (TCP/IP) or user datagram protocol (UDP). Network can include wire or cable connections, such as devices coupled via communication cables. Network 160 can include a cloud environment, including shared computer resources and data that can be available on demand. Network 160 can be local network, wide area network or a cellular network. Network 160 can be internal or external to the system 100.

Server 170 can include any server, network device or cloud-based function for completing a transaction. Server 170 can include network-based transaction processing functionality that can communicate with TD 130 to complete the transaction (e.g., a synthetic transaction). Server 170 can include banking or credit card information or data. Server 170 can include data of the user, such as a user's access to a credit card account, banking account (e.g., checking or savings), a cryptocurrency account, an investment account (e.g., stocks and/or bonds account) or any other account that a user can access to process transactions.

Figure 2:
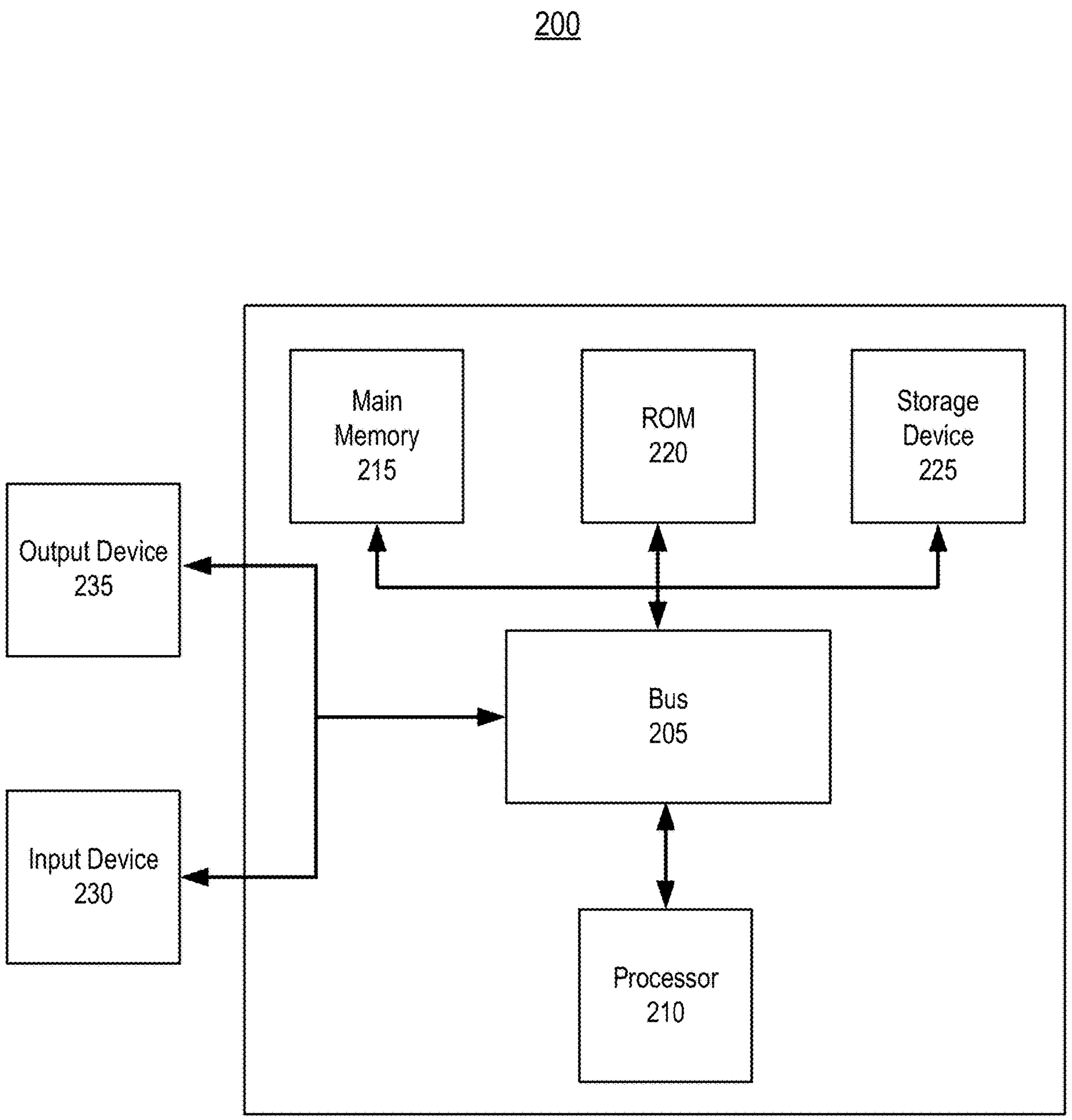
FIG. 2 depicts a block diagram illustrating an architecture for a computer system that can be employed to implement elements of the systems and methods described and illustrated herein, including, for example, the system depicted in FIG. 1 and the operational flows or methods depicted in FIGS. 3 and 4.

FIG. 2 is a block diagram of an example computer system 200. The computer system or computing device 200 can include or be used to implement the system 100, or its components such as the POS device 102, TD 130, MC 140 and CS 150 and/or server 170. The computing system 200 can include a bus 205 or other communication component for communicating information and a processor 210 or processing circuit coupled to the bus 205 for processing information. The bus 205 can interconnect the components of the system 100, such as the POS device 102, TD 130, MC 140 and CS 150.

The computing system 200 can also include one or more processors 210 or processing circuits coupled to the bus 205 for processing information. The computing system 200 also includes main memory 215, such as a random access memory (RAM), static RAM, dynamic RAM, flash memory, cache memory or other static or dynamic storage device, coupled to the bus 205 for storing information, and instructions to be executed by the processor 210.

The main memory 215 can be or include the data repository for storing any data or values described herein. The main memory 215, as well as the main memory 215, can also be used for storing position information, temporary variables, data or other intermediate information during execution of instructions by the processor 210. The computing system 200 can further include a read only memory (ROM) 220 or other static storage device coupled to the bus 205 for storing static information and instructions for the processor 210. A storage device 225, such as a solid state device, magnetic disk or optical disk, can be coupled to the bus 205 to persistently store information and instructions. The storage device 225 can include or be part of the data repository.

The computing system 200 can be coupled via the bus 205 to an output 235, such as a liquid crystal display, or active matrix display, for displaying information to a user. An input device 230, such as a keyboard including alphanumeric and other keys, can be coupled to the bus 205 for communicating information and command selections to the processor 210. The input device 230 can include an output device 235, such as a touch screen display. The input device 230 can also include a cursor control, such as a mouse, a trackball, or cursor direction keys, for communicating direction information and command selections to the processor 210 and for controlling cursor movement on the output device 235, e.g., the display. The output 235 can be part of the POS device 102, TD 130, MC 140 or CS 150 or other components of FIG. 1.

The processes, systems and methods described herein can be implemented by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement can also be employed to execute the instructions contained in main memory 215. Hard-wired circuitry can be used in place of or in combination with software instructions together with the systems and methods described herein. Systems and methods described herein are not limited to any specific combination of hardware circuitry and software.

Although an example computing system has been described in FIG. 2, the subject matter including the operations described in this specification can be implemented in other types of digital electronic circuitry, or in computer software, firmware, or hardware, including the structures disclosed in this specification and their structural equivalents, or in combinations of one or more of them.

For example, the present solution can include a system 100 for validating integrated circuits (IC) cards 154. The system can include one or more POS devices 102, TDs 130, MCs 140 and CSs 150 that can be integrated into a single standalone system or distributed into communicatively coupled separate components. The system 100 can be utilized for automated testing and validation of IC cards 154 in a serial (e.g., individual and iterative) fashion or in a parallel fashion, such as where a plurality, or all, of IC cards 154 are processed at the same time.

System 100 can include a microcontroller 140 having one or more processor circuitries (e.g., processors 210) and one or more memories 215. The one or more processors 210 can be configured (e.g., via instructions and/or data in memory 215) to implement various functionalities described herein. The one or more processors 210 can be configured to receive an instruction 106 to select a slot 152 of a plurality of slots 152 in a card stack 150. The instruction 106 can be received via an automation script 104 that can be executed by a POS device 102. For example, an automation script 104 executing on a POS device 102 can generate or issue an instruction 106. The instruction 106 can cause the one or more processors 210 to select a slot 152 at CS 150. The slot 152 can correspond to, store or include a particular IC card 154 to be tested or validated by the system 100.

The one or more processors 210 can be configured to activate the slot 152 to establish an electrical connection between an integrated circuit card 154 in the slot 152 and a proxy card 132 in a terminal device 130. The one or more processors 210 can be configured to activate the slot 152 responsive to the instruction 106. The slot 152 can be activated, for example, using electric connection between the slot 152 and/or IC card 154 within the slot and TD 130. For example, the one or more processors 210 can be configured to turn on, initiate, connect to, or set up a connection with or activate an IC card 154 in the slot 152 according to an instruction 106. Instruction 106 can include, for example, transaction data 122. Activating the slot 152 and/or IC card 154 in the slot 152 can include establishing an electrical connection (e.g., a communication for transmitting electric or electronic signals or data) between an IC card 154 in the slot 152 and a TD 130 and/or proxy card 132 of the TD 130. The electrical connection can include a connection to exchange information or data via electrical conductors (e.g., wiring, such as bus 205) or wirelessly (e.g., via network, such as network 160) between the IC card 154 at the slot 152 of the CS 150 and TD 130 or its proxy card 132.

The one or more processors 210 can be configured to receive an indication from an indicator 138 that the synthetic transaction is complete. The indication can be received subsequent to initiation by the automation script 104 of a synthetic transaction with the IC card 154 in the card stack 150 via the proxy card 132 in the terminal device 130, For example, the one or more processors 210 can be configured to receive an indication from an indicator 138 of the TD 130. The indication can indicate that the synthetic transaction for testing the IC card 154 at the slot 152 is complete. The indication can be issued by the indicator 138 responsive to a portion of the synthetic transaction being initiated or completed by automation script 104 via instructions 106. The indication can be issued by the indicator 138 responsive to the synthetic transaction being completed by transaction manager 136 of the TD 130. The synthetic transaction can be implemented or processed according to transaction data 122 from the request 120 of the POS device 102.

The one or more processors 210 can be configured to deactivate, subsequent to receipt of the indication (e.g., from the indicator 138) that the synthetic transaction is complete, the slot 152 to terminate the electrical connection between the integrated circuit card 154 in the slot 152 of the card stack 150 and the proxy card 132 in the terminal device 130. Terminating the electrical connection can cause the terminal device 130 to detect a card removal event without physical removal of the proxy card 132. For example, deactivating the slot 152 can include creating an open circuit so as to disconnect the slot from the power source, disconnect the slot from the TD 130 or the electrical connection. For example, TD 130 can determine that a card removal event has occurred at the TD 130 in response to the electrical connection between TD 130 and the IC card 154 at the slot 152 being tested, has been terminated.

System 100 can include the point of sale device 102 that can include one or more processors 210 configured to execute the automation script 104. The point of sale device 102 can be configured to establish a communication session with the terminal device 130. The point of sale device 102 can be configured to transmit, to the terminal device 130, a request 120 for the synthetic transaction to cause the terminal device 130 to process the request 120 for the synthetic transaction via the proxy card 132 in the terminal device 130. For instance, the AS 104 can establish a session with the TD 130 and send the request 120 to cause the TD 130 utilize a transaction manager 136 to implement the synthetic transaction via the proxy card 132 and utilizing a specific IC card 154 in the activated slot 152.

System 100 can include the POS device 102 that can include one or more processors 210 to execute the automation script 104. The POS device 102 can be configured to transmit, to the terminal device 130, a request 120 for the synthetic transaction comprising transaction data 122 including an amount of the synthetic transaction. The POS device 102 can transmit, to the MC 140, the instruction 106 to activate the slot 152 subsequent to transmission of the request 120 for the synthetic transaction to the terminal device 130. In some cases, the POS device 102 can transmit the instruction to activate the slot 152 after a certain time interval. The time interval can be set or established to emulate the time taken to insert a physical card into the card slot. For example, a time interval subsequent to the request 120 including the transaction data 122 (e.g., amount of synthetic transaction) can include one or more milliseconds, one or more tens of milliseconds or one or more hundreds of milliseconds, or one or more seconds. The instruction 106 to activate the slot 152 can activate a particular slot 152 corresponding to an IC card 154 having, matching or corresponding to the transaction data 122 from the request 120. The time interval can be designed to emulate or correspond to a time duration it takes to conduct a transaction by inserting or removing IC cards 154. The time interval can be designed to emulate or correspond to a time period that would allow to increase or maximize the number of synthetic transactions that could be processed within a given time period. For example, the time interval can be selected based on processing time of the different components in the system 100, such as the time to process a synthetic transaction by the TD 130 or the system 100.

The POS device 102 can include one or more processors 210 to execute the automation script 104. The POS device 102 can be configured to select the slot 152 of the plurality of slots 152 at the CS 150. The slot 152 can be selected according to or based on transaction data 122 including an identifier encoded in an amount of the synthetic transaction. For instance, a request 120 from the POS device 102 to the TD 130 can include transaction data including an identifier (e.g., identifier of a particular IC card 154 or slot 152). The synthetic transaction can include at least one of a purchase transaction, a return transaction, or a void transaction. For example, the synthetic transaction can include a purchase transaction involving a purchase of goods. For example, the synthetic transaction can include a return transaction, involving a return of goods. For example, the synthetic transaction can include a void transaction, involving voiding of purchase or return of goods.

System 100 can include the POS device 102 including one or more processors 210 configured to execute the automation script 104. The POS device 102 can be configured to determine that the synthetic transaction is complete. The determination can be made responsive to the TD 130 processing the synthetic transaction. The POS device 102 can be configured to transmit, to the MC 140 based on the determination that the synthetic transaction is complete, the indication that the synthetic transaction is complete. The POS device 102 can be configured to determine, subsequent to the determination that the synthetic transaction is complete, a performance of the synthetic transaction corresponding to at least one of a success, an error, or a partial success.

System 100 can include the POS device 102 comprising one or more processors 210 configured initiate a second synthetic transaction. The second synthetic transaction can be split into a first portion and a second portion. The POS device 102 can be configured to instruct, for the first portion of the second synthetic transaction, the MC 140 to activate a first slot 152 of the plurality of slots 152 that contains a first IC card 154. The instruction to activate the first slot 152 can cause the TD 130 to process the first portion of the second synthetic transaction with the first IC card 154. The POS device 102 can be configured to instruct the MC 140 to deactivate, subsequent to completion of the first portion of the synthetic transaction, the first slot 152 to terminate a first electrical connection between the first IC card 154 in the first slot 152 and the proxy card 132 in the TD 130. Deactivating the first slot 152 can include creating an open circuit, or disconnect, between the first slot 152 and the TD 130, or ending the electric connection with the first slot 152. Instructing the MC 140 to deactivate the first slot 152 can cause the TD 130 to detect a card removal event without physical removal of the proxy card 132. For example, TD 130 can detect a card removal event at the TD 130 responsive to an instruction to deactivate a slot 152 or responsive to a signal that the slot has been deactivated. The POS device 102 can be configured to instruct, for the second portion of the second synthetic transaction and subsequent to deactivation of the first slot 152, the MC 140 to activate a second slot 152 of the plurality of slots 152 that contains a second IC card 154. Instructing the MC 140 to activate the second slot 152 can cause the TD 130 to process the second portion of the second synthetic transaction with the second IC card 154. The instruction to activate the second slot 152 and/or the second IC card 154 can be generated or issued in response to a confirmation that the first slot and/or the first IC card 154 has been deactivated.

The POS device 102 can include one or more processors 210 to execute the automation script 104 and configured to execute a multi-card synthetic transaction with the proxy card 132 in the TD 130 to validate a plurality of IC cards 154. The plurality of IC cards 154 can be stored in the plurality of slots 152 of the card stack 150. The multi-card synthetic transaction can use the proxy card 132 inserted into, or coupled with, the TD 130 to validate the plurality of IC cards 154 without physical removal of the proxy card 132 from the TD 130. For example, the plurality of IC cards 154 can each be tested and validated using the automation script 104 without either the plurality of IC cards 154 being removed from the CS 150 or the proxy card 132 being moved from the TD 130.

The POS device 102 can include one or more processors 210 configured to communicate, via a network 160, with one or more servers 170. The one or more servers 170 can be remote from the POS device 102. At least one of the TD 130 or the POS device 102 can communicate with the server 170 to execute the synthetic transaction. The proxy card 132 can lack a portion or a whole integrated circuit chip or circuitry, magnetic strip or NFC antenna, circuitry or device. For example, the proxy card 132 can exclude a portion of a chip completing the transaction, but instead allowing a remote IC card 154 at a card stack 150 to be used instead. For example, the proxy card 132 can exclude a portion of a signal, or code on a magnetic strip, but instead allowing the magnetic strip to provide the signal together with a coil (e.g., magnetic coil 705). For example, the proxy card 132 can exclude a portion of NFC device or system, but instead allowing the NFC device or system of a remote IC card 154 to complete a transaction. The IC card 154 can store data used to conduct the synthetic transaction. For example, the proxy card 132 can include the structure of functionality to cause the card detector 134 to determine that an IC card 154 or proxy card 132 is inserted, coupled or present in the TD 130.

The proxy card 132 can lack or include an altered or modified version of a transaction interface, such as a modified magnetic strip, an NFC device or antenna or an IC chip or circuitry for communication with the system 100 and providing data to the system 100. For example, the modified transaction interface can be configured to provide the TD 130 and/or pin pad a return signal indicative of the presence of the proxy card 132, while allowing a remote IC card 154 to complete the transaction. The IC card 154 can store data that can be used to conduct synthetic transactions. For example, the IC card 154 can include or store data used to conduct the synthetic information, which can be then transmitted or communicated to the TD 130 to use by the transaction manager 136. The data stored on the IC card 154 can be used to complete the synthetic transaction.

The CS 150 can store a plurality of heterogeneous IC cards 154 in the plurality of slots 152. For example, a first IC card 154 utilizing a magnetic strip functionality can be stored in a first slot 152, while a second IC card 154 utilizing an NFC functionality can be stored in a second slot 152. For example, a third IC card 154 utilizing a chip functionality can be stored in a third slot 152. The system 100 can simultaneously process, per AS 104 and instructions 106, each one of the first, second and the third IC card 154. Simultaneous processing of multiple IC cards 154 can be implemented such that processing (e.g., testing or validating) each of the IC cards 154 overlaps for at least a portion of the processing time. For example, the present solution can include a separate box for NFC card and common box for chip and magnetic stripe card. Out of four boxes, one can be dedicated to NFC card as multiplexer circuit for tap card can be different than EMV and chip card. In one example, all four boxes can include heterogeneous cards.

Figure 3:
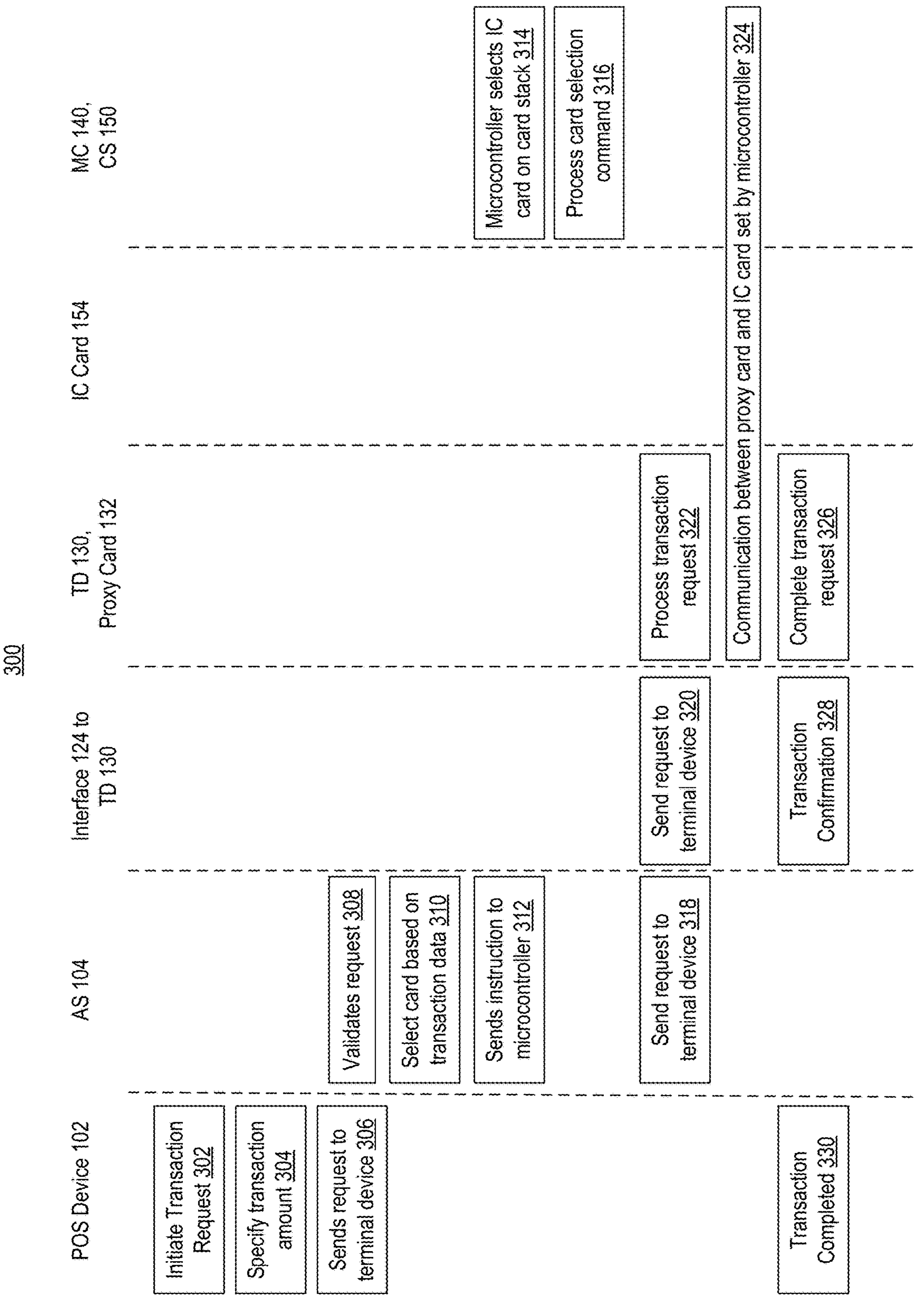
FIG. 3 illustrates an example method of multiplexing-based validation via a proxy card at a terminal device.

FIG. 3 illustrates an example of a method 300 of automated testing or validating IC cards 154 at a CS 150, using a proxy card 132 at terminal device 130. The method 300 can be implemented using, for example, system 100 of FIG. 1 and computing system 200 of FIG. 2. The method 300 can include ACTS 302-330. At ACT 302, a POS device can initiate a transaction request. At ACT 304, the POS device can specify the transaction amount. At ACT 306, the POS device can send the request to a terminal device. At ACT 308, the automation script can validate the request. At ACT 310, the automation script can select the IC card based on transaction data. At ACT 312, the automation script can send the instruction to the microcontroller. At ACT 314, the microcontroller can select the IC card on the card stack. At ACT 316, the card stack and the microcontroller can process the card selection command. At ACT 318, the automation script can send the request to terminal device. At ACT 320, the interface to terminal device can send the request to the terminal device. At ACT 322, the terminal device and the proxy card can process the transaction request. At ACT 324, the terminal device, the proxy card, the IC card, the microcontroller and the card stack can implement the communication between the proxy card and the IC card set by the microcontroller. At ACT 326, the terminal device and the proxy card can complete the transaction request. At ACT 328, the interface to the terminal device can issue or send a transaction confirmation. At ACT 330, the point of sale device can receive the notification that the transaction is completed.

At ACT 302, a POS device can initiate a transaction request. The transaction request can be a request to initiate testing or validation of one or more IC cards at a card stack. The transaction request can be a request to initiate a session with a terminal device. For example, the request can be a request to initiate a synthetic transaction of one IC card, or a plurality of IC cards via a session with the terminal device.

At ACT 304, the POS device can specify the transaction amount. The POS device can identify, indicate or specify any transaction data. Transaction data can include any data related to the synthetic transaction to be implemented, including the transaction amount, type of transaction to complete (e.g., purchase transaction, return transaction or void transaction), technology or transaction interface to use for completing the transaction (e.g., magnetic strip, chip technology or NFC contactless payment), a type of a card to use for the transaction (e.g., credit card, debit card or a gift card), or any other transaction data.

At ACT 306, the POS device can send the request to a terminal device. The POS can send the request via the interface of the POS device to the interface of the terminal device. The request can include the transaction data, such as the transaction amount. The request can be sent to the terminal device via the session established between the POS device and the terminal device.

At ACT 308, the automation script can validate the request. Prior to transmitting the request (e.g., with the transaction data) to the terminal device, the automation script can intercept the request and validate the request. The automation scrip can read, detect or monitor the information (e.g., transaction data) in the request and can access the information about the IC card to be tested. After validating the request, the request can be sent to the terminal device, via communication interfaces of the point of sale device and the terminal device.

At ACT 310, the automation script can select the IC card based on transaction data. The automation script can select an IC card from a plurality of IC cards at the card stack. The automation script can select the IC card based on, or according to, the transaction data from the request. For example, the automation script can identify or select the specific IC card to test or validate according to the transaction amount.

At ACT 312, the automation script can send the instruction to the microcontroller. The instruction can include identification of the selected IC card or IC slot to use for the testing and/or validation. The automation script can send the instruction, including the information about the selected IC card, to the microcontroller.

At ACT 314, the microcontroller can select the IC card on the card stack. The microcontroller can select a memory location in a storage, where the memory location corresponds to an IC card being tested. The microcontroller can utilize a MUX to select an IC card or an IC slot at the card stack. The microcontroller can utilize the instruction from the automation script to implement the IC card selection at the card stack. For example, the microcontroller can identify the slot that includes, stores, houses, or corresponds to the selected IC card.

At ACT 316, the card stack and the microcontroller can process the card selection command. For example, the microcontroller can activate the slot that stores, corresponds to, or includes the IC card to be tested. The microcontroller can instruct the MUX to communicate with an IC card, an IC slot or a memory location in a storage corresponding to an IC card being tested. The microcontroller can establish a connection with the slot corresponding to the selected IC card.

At ACT 318, the automation script can send the request to terminal device 318. The request can be a request to process the synthetic transaction in order to test or validate the selected IC card. The request can include transaction data that can be used to facilitate the synthetic transaction. The request can be sent to the terminal device, so that the terminal device can process or manage the synthetic transaction implementation.

At ACT 320, the interface to terminal device can send the request to the terminal device. The request from the automation script can be sent to the terminal device in order for the terminal device to process the request using the proxy card.

At ACT 322, the terminal device and the proxy card can process the transaction request. The terminal device can utilize the transaction manager to process the synthetic transaction using the selected IC card and via the proxy card inserted into, integrated with, connected to, or otherwise coupled with the terminal device. The card detector of the terminal device can make a determination that IC card is inserted into, or coupled with, the terminal device, and in response to this determination, process the synthetic transaction via the proxy card and the IC card at the card stack.

At ACT 324, the terminal device, the proxy card, the IC card, the microcontroller and the card stack can implement the communication between the proxy card and the IC card set by the microcontroller. The terminal device can communicate with the IC card, using the proxy card coupled with the terminal device. The IC card can provide information or data to the terminal device, such as information or data for accessing the account (e.g., credit card account or bank account) of a user.

At ACT 326, the terminal device and the proxy card can complete the transaction request. The terminal device and the proxy card can determine that the synthetic transaction has been completed. The terminal device can issue an indication, via an indicator of the terminal device, that the synthetic transaction has been completed.

At ACT 328, the interface to the terminal device can issue or send a transaction confirmation. The interface to the terminal can forward the indication, from the terminal device to the point of sale device, that the synthetic transaction is completed.

At ACT 330, the point of sale device can receive the notification that the transaction is completed. The point of sale device can receive the indication from the terminal device that the synthetic transaction is completed. The point of sale device can then initiate a second transaction request in order to start testing or validating a next IC card in the card stack. The point of sale device can initiate or repeat the ACTS 302-330 for the next IC card and all subsequent IC cards until all IC cards in the card stack have been tested and validated.

Figure 4:
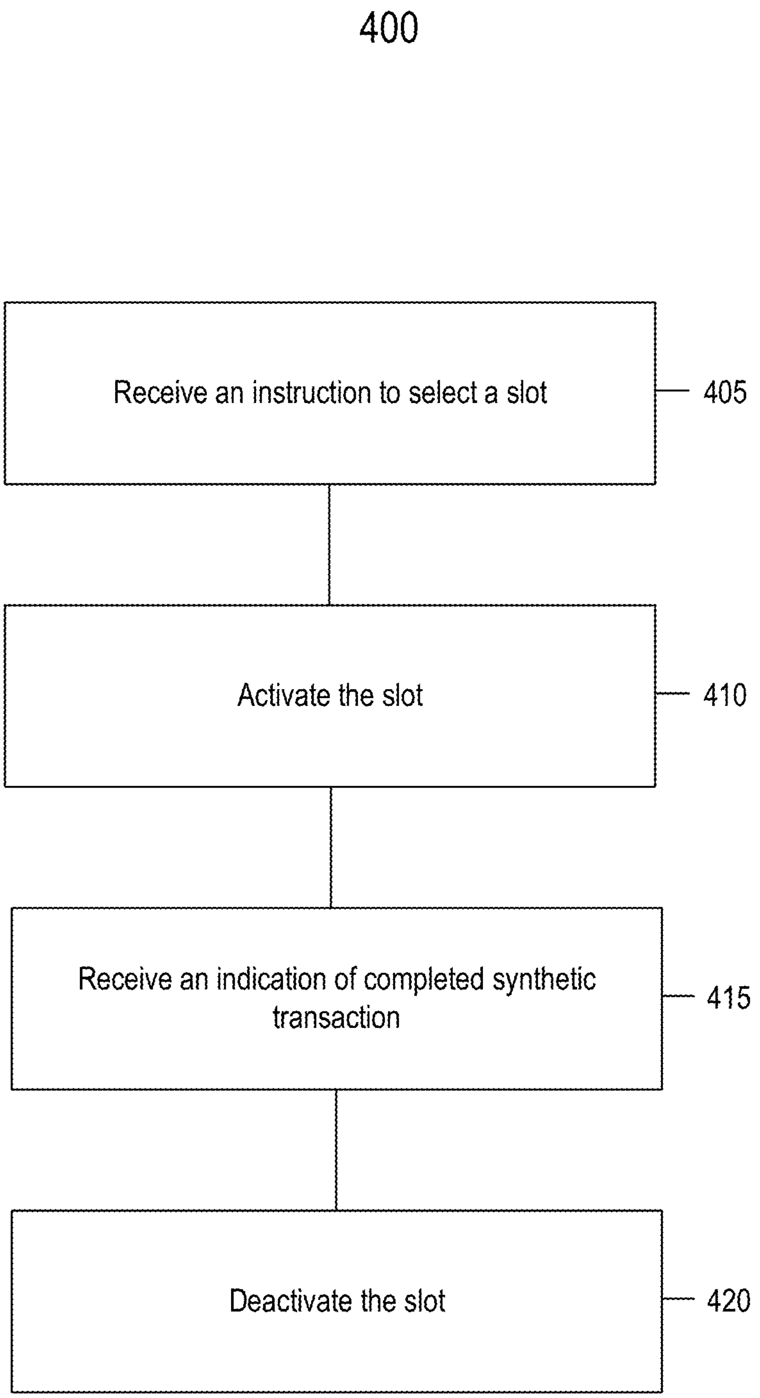
FIG. 4 illustrates another example method of multiplexing-based validation via a proxy card at a terminal device.

FIG. 4 illustrates an example method 400. The method 400 can include a process of automated testing or validating IC cards 154 using a proxy card 132 at a terminal device 130. The method 400 can be implemented using, for example, any combination of example systems 100, 200, 500, 700, 800, 900, 1000 or 1100 of FIGS. 1, 5, 7, 8, 9, 10 and 1100. The method 400 can include ACTS 405 through 420. At ACT 405, a microcontroller can receive an instruction to select a slot. At ACT 410, the microcontroller can activate the slot. At ACT 415, the microcontroller can receive an indication of completed synthetic transaction. At ACT 420, the microcontroller can deactivate the slot.

At ACT 405, a microcontroller can receive an instruction to select a slot. The microcontroller can receive and instruction to select an IC card from a plurality of IC cards at the card stack. In some embodiments, a card selector can receive an instruction to select a slot or an IC card. The microcontroller can include one or more processor circuitries and memory for storing data or instructions. The method can include the microcontroller or the card stack receiving, via an automation script executed by a point of sale device, an instruction to select a slot of a plurality of slots in a card stack. The request can be generated or issued by the point of sale device. The automation script can validate the request prior to the request being transmitted from the point of sale device to the microcontroller. The instruction can be received via a cable. The instruction can be received wirelessly (e.g., via a NFC antenna). The instruction can be received via both, one or more cables and via one or more NFC antennas. In some examples, connection between POS and card stack can include USB wired connection. In some examples, wired Ethernet can be used as the connection. In some examples, any combination of wired and wireless components can be used for connections, such as USB cables, Wi-Fi connections, Bluetooth connections, or NFC technology.

The point of sale device can transmit to the terminal device, a request for the synthetic transaction to cause the terminal device to process the request for the synthetic transaction via the proxy card in the terminal device. The terminal device can generate transmit the request for the synthetic transaction in response to a user input (e.g., a pin pad input, a magnetic stripe swipe, an NFC wireless communication from an IC or a proxy card or a contact from a chip of an IC card). The point of sale device can establish a communication session with the terminal device. The session can be a session for completing or implementing one or more synthetic transactions via the terminal device and a proxy card coupled with the terminal device. The synthetic transaction can utilize an integrated circuit card of a slot of a card stack to receive data or information for completing the synthetic transaction, via the proxy card. The synthetic transaction can include any one of a purchase transaction, a return transaction, or a void transaction.

The point of sale device can initiate multiple synthetic transactions, which can be processed in serially (e.g., one after another) or in parallel (e.g., at the same time). Transactions can include any one or more of a contact chip transaction, a magnetic stripe transaction or an NFC wireless transaction. For example, the point of sale device can initiate a first synthetic transaction and a second synthetic transaction. The point of sale device can initiate a particular synthetic transaction (e.g., a second synthetic transaction) that can be split into a first portion and a second portion. The first portion of the synthetic transaction can include processing a first port of the amount of the transaction from a first integrated circuits card and processing a second part of the amount of the transaction from a second integrated circuits card.

At ACT 410, the microcontroller can select or activate the slot. In some embodiments, the card stack 150 can select and/or activate the slot and/or the IC card. The method can include the microcontroller or the card stack activating the slot to establish an electrical connection between an integrated circuit card in the slot and a proxy card in a terminal device. The microcontroller or the card stack can activate the slot responsive to the instruction received from the point of sale device. Activation of the slot can cause the terminal device to determine that an IC card action by a user has been implemented. For example, activation of the slot can cause the terminal device to determine that a card insertion event has occurred at the terminal device, or that a contact chip has made a contact with a terminal device, or that that an IC card was swiped through the magnetic coil or that an IC card has implemented an NFC wireless communication with the terminal device. The slot can be activated by creating a connection with the slot or the integrated circuit stored in, associated with or corresponding to, the slot. The microcontroller can establish an electrical connection or a communication between the microcontroller and the slot, the terminal device and the slot or the proxy card and the integrated circuit corresponding to the slot. The connection or the communication can allow exchange of information or data between the terminal device and the integrated circuit associated with, or corresponding to, the slot.

The method can include the point of sale device transmitting to the terminal device a request for the synthetic transaction. The request can include transaction data, including for example an amount of the synthetic transaction, a type of technology to use by the integrated circuits card to use for the transaction (e.g., NFC contactless payment technology, magnetic strip technology, chip technology), the type of the card to use for the transaction (e.g., credit card, debit card, gift card or any other card), or any other transaction data.

The method can include the point of sale device transmitting, to the microcontroller, the instruction to activate the slot based on a time interval subsequent to transmission of the request for the synthetic transaction to the terminal device. For instance, the point of sale device can allow a time interval to lapse after a prior request for initiating a preceding synthetic transaction. The time interval can include, for example, one or more milliseconds, one or more tens of milliseconds, one or more hundreds of milliseconds, or one or more seconds. The point of sale device can transmit to the microcontroller the instruction to activate the slot based on a time interval since completion of a prior synthetic transaction.

The point of sale device can select the slot of the plurality of slots based on, or according to, an identifier encoded in an amount of the synthetic transaction. The identifier can identify the slot or the integrated circuits card associated with the slot. The point of sale device can select the slot based on, or according to, a transaction data, such as the type of the integrated circuits card or type of technology on the card to use.

The point of sale device can instruct the microcontroller to process the first and the second portions of a particular (e.g., second) synthetic transaction. The point of sale device can instruct the microcontroller to activate a first slot of the plurality of slots that contains a first integrated circuit card to cause the terminal device to process the first portion of the second synthetic transaction with the first integrated circuit card. The point of sale device can instruct the microcontroller to activate a second slot of the plurality of slots that contains a second integrated circuit card to cause the terminal device to process the second portion of the second synthetic transaction with the second integrated circuit card.

At ACT 415, the microcontroller can receive an indication of completed synthetic transaction. The method can include the microcontroller or the card stack receiving an indication that the synthetic transaction is complete. The microcontroller or the card stack can receive the indication subsequent to initiation by the automation script of a synthetic transaction with the integrated circuit card in the card stack via the proxy card in the terminal device. The microcontroller or the card stack can receive the indication subsequent to a signal that a portion of the synthetic transaction is completed. The microcontroller or the card stack can receive the indication responsive to a signal that the transaction is completed.

The indication can indicate that a transaction has been implemented using a NFC wireless communication. The indication can indicate that a transaction has been implemented using a magnetic stripe interaction with a magnetic coil. The indication can indicate that a transaction has been implemented using a contact chip making a contact with a terminal device. The indication can be provided responsive to the terminal device detecting the presence of the proxy card and determining that the IC card has been detected (instead of the proxy card).

The indication can be generated or issued by an indicator of the terminal device and in response to the manager of the terminal device receiving the information or data of the user from the integrated circuits card at the selected slot. The indication can be generated or issued by an indicator of the terminal device and in response to the manager of the terminal device receiving, from a remote server, a confirmation that the transaction has been completed using the user data received from the integrated circuits card.

The point of sale device can determine, responsive to the terminal device processing the synthetic transaction, that the synthetic transaction is complete. For example, the terminal device can receiving, from the integrated circuits card, a user information or data to be used by a remote server for processing the transaction. The terminal device can send the received user information or data to the remote server and receive from the remote server, a confirmation that the synthetic transaction has been completed.

The point of sale device can transmit to the microcontroller, based on the determination that the synthetic transaction is complete, the indication that the synthetic transaction is complete. In some embodiments, the terminal device sends the indication to the microcontroller and the point of sale device. The point of sale device can determine, subsequent to the determination that the synthetic transaction is complete, a performance of the synthetic transaction corresponding to at least one of a success, an error, or a partial success.

At ACT 420, the microcontroller can deactivate the slot. The method can include the microcontroller or the card stack deactivating the slot to terminate the electrical connection between the integrated circuit card in the slot of the card stack and the proxy card in the terminal device to cause the terminal device to detect a card removal event without physical removal of the proxy card. The deactivation can be done subsequent to receiving the indication that the synthetic transaction is complete. For example, the microcontroller can deactivate the slot to terminate electrical connection or communication between the integrated circuits card and the terminal device, responsive to the signal that the synthetic transaction is completed. Deactivation of the slot can cause the terminal device to determine that a card removal event has occurred.

In the instance in which the transaction (e.g., the second transaction) includes the first portion and the second portion, the point of sale device can deactivate the first slot to terminate a first electrical connection between the first integrated circuit card in the first slot and the proxy card in the terminal device. Terminating the first electrical connection can cause the terminal device to detect a card removal event without physical removal of the proxy card. The first electrical connection can be terminated subsequent to completion of the first portion of the synthetic transaction or responsive to the completion of the first portion of the synthetic transaction.

The point of sale device can instruct the microcontroller to activate, for the second portion of the second synthetic transaction, a second slot of the plurality of slots that contains a second integrated circuit card to cause the terminal device to process the second portion of the second synthetic transaction with the second integrated circuit card. The activation of the second slot can be implemented for the second portion of the second synthetic transaction subsequent to deactivation of the first slot or in response to the deactivation of the first slot. The activation of the second slot can be implemented subsequent to completion of the first portion of the second transaction or responsive to the completion of the first portion of the second transaction.

Figure 5:
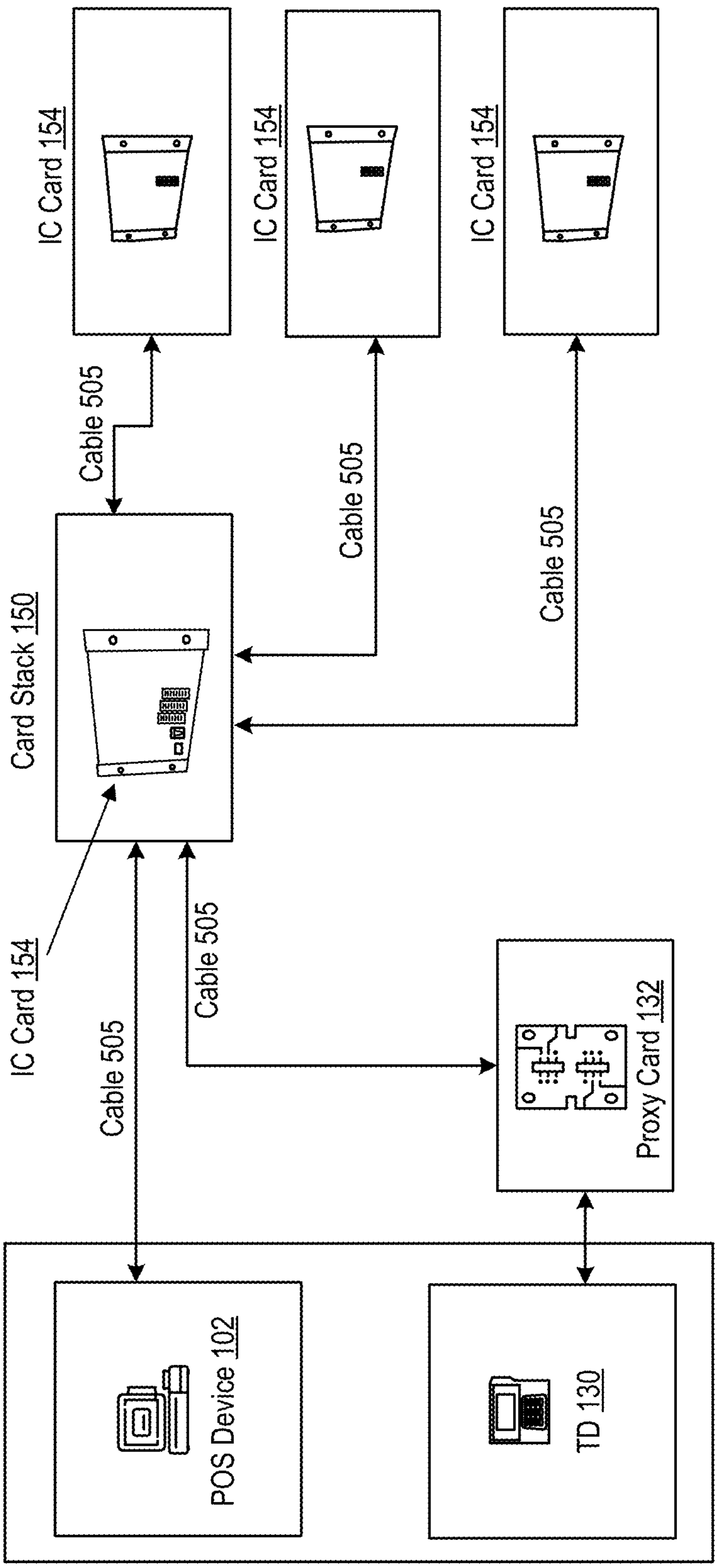
FIG. 5 illustrates an example of a system diagram of interactions between the point of service device, terminal device and the integrated circuits cards.

FIG. 5 illustrates an example of a system diagram of interactions between the point of service device 102, terminal device 130 and the integrated circuits cards 154. A POS device 102 can be connected with a card stack 150 via a cable 505, such as a universal serial bus (USB) cable. Card stack 150 can include an IC card 154 to be used for processing a synthetic transaction. A TD 130 can include a proxy card 132 inserted or coupled with the TD 130. The TD 130 and/or proxy card 132 can be connected to the card stack 150 and/or IC card 154 at the card stack, via a cable 505, such as a data cable, USB cable, Ethernet cable, VGA cable, or any other type of communication cable. Card stack 150 can include a plurality of IC cards 154, such as up to 10, 20, 50, 100, or more than 100 cards. In one example, a master stack can be connected to POS and rest of slave stack can be connected to the master.

Figure 6:
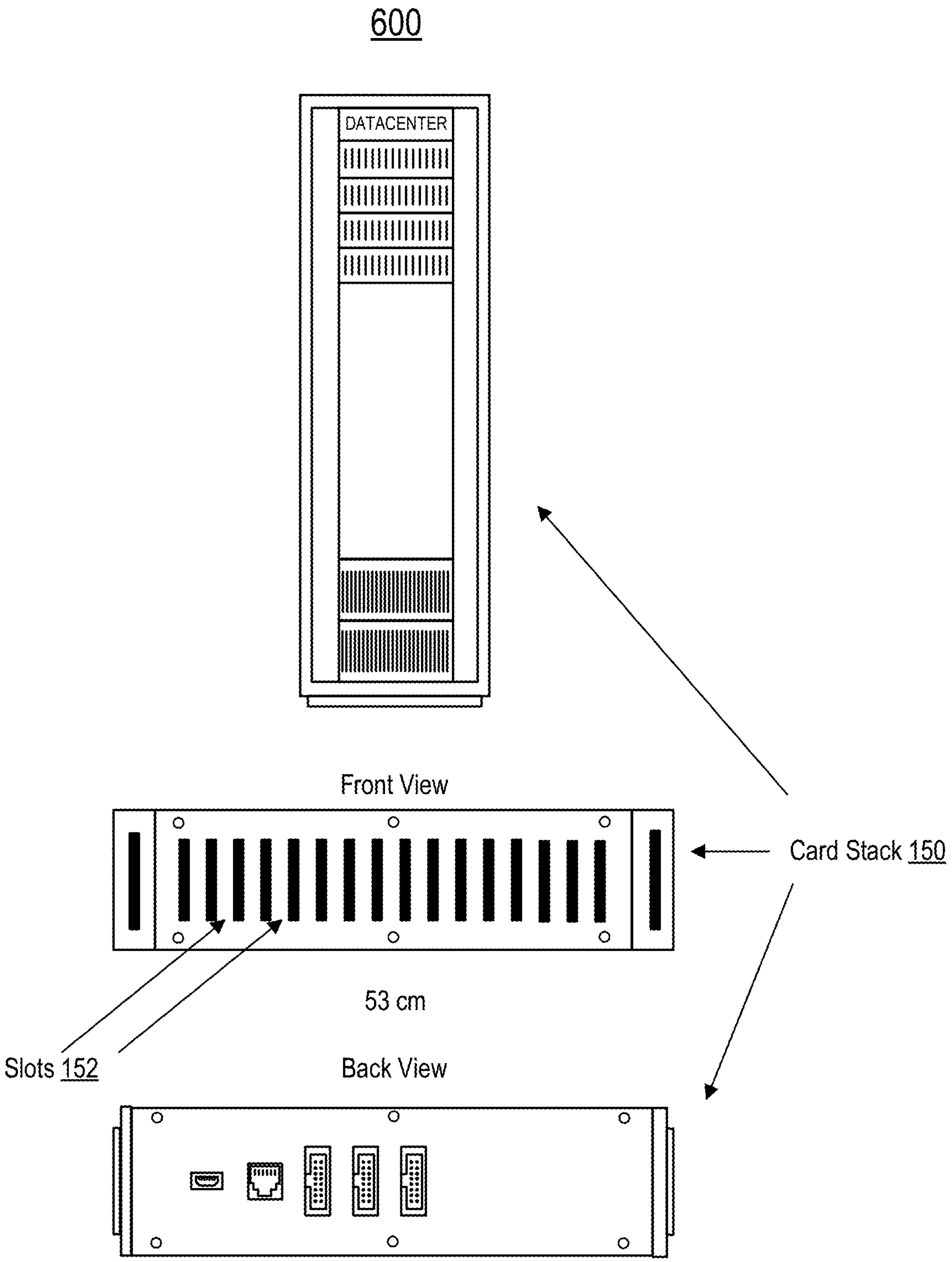
FIG. 6 illustrates an example of a system illustration of an embodiment of a card stack of the present solution.

FIG. 6 illustrates an example of a system illustration of an embodiment of a card stack 150 of the present solution. In an embodiment, a card stack 150 can include a three dimensional rectangular cuboid. One side of the card stack 150 can include a plurality of slots 152 into which IC cards 154 can be inserted. In some embodiments, the card stack 150 can include between 10 and 20 slots 152 for receiving IC cards 154, such as 16 slots, for example. Card stack 150 can include any number of slots 152, including up to 20, 40, 60, 80, 100, 500, 1000 or more than a 1000 IC cards 154.

Figure 7:
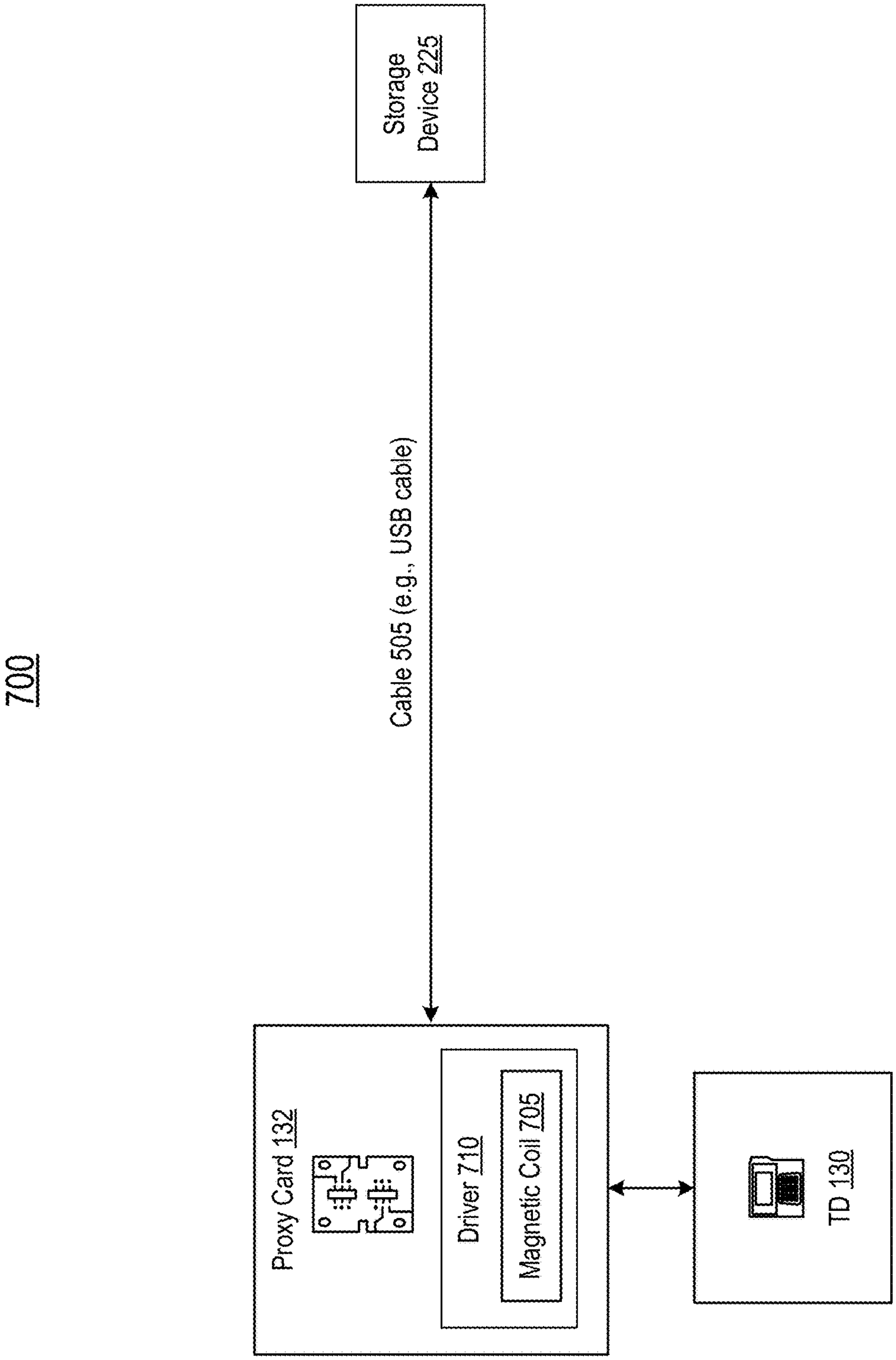
FIG. 7 illustrates an example of a system for a magnetic stripe card test automation and validation using a magnetic coil and a driver acting as a proxy card.

FIG. 7 illustrates an example of a system 700 for a magnetic stripe card test automation and validation using a magnetic coil 705 and a driver 710. System 700 can include a TD 130 with a proxy card 132. TD 130 can be communicatively coupled with a magnetic coil 705 driven by a driver 710. The magnetic coil 705 and driver 710 can be communicatively coupled, via a cable 505 (e.g., a USB cable) with a storage device 225 in which multiple memory locations store data represent, or correspond to, IC cards 154 being tested for magnetic stripe transactions.

For example, a magnetic coil 705 and driver 710 can be a part of a proxy card 132. For example, a single proxy card 132 can include a coil 705 and a driver 710. In some example, magnetic coil 705, driver 710 and proxy card 132 can each be separate components which can be communicatively coupled with each other, or can be included in, or combined with, a TD 130 in any arrangement (e.g., physically integrated with the TD 130 or communicatively coupled with TD 130). TD 130 and storage device 225 can communicate with each other via a cable 505 and via the proxy card 132 that can utilize its driver 710 and/or magnetic coil 705.

Magnetic coil 705 can include any coil of wires or conducting materials. Magnetic coil 705 can be configured to cause a change in the magnetic field surrounding the coil when an IC card (e.g., IC card 154 or proxy card 132) is swiped through or next to the magnetic coil 705. The change in the magnetic field can induce a voltage to create a current that can be used to signal account information to the system (e.g., TD 130).

Driver 710 can include any circuitry or device for driving the magnetic coil 705. Driver 710 can include power supply or power modulator providing power (e.g., voltage and/or current) to the magnetic coil 705. Driver 710 can provide a steady or a variable voltage or current to the magnetic coil 705. Driver 710 can include the functionality to module or change the magnetic field in the magnetic coil 705 to provide a particular signal output (e.g., a particular account information). For example, driver 710 can receive, include and/or execute instructions to provide a particular pattern of power/current/voltage output to the magnetic coil 705 to cause the magnetic coil 705 to generate a particular signal output for a particular IC card 154 when a blank (e.g., proxy card 132) is swiped through, or next to, the magnetic coil 705.

In some embodiments, system 700 does not include a physical IC card 154. For example, data of all IC cards 154 to be tested for magnetic stripe functionality can be stored and made available to the system 700 in the form of one or more files, instructions, commands or data stored on storage device 225 (e.g., a ROM memory). For example, a proxy card 132 can be interfaced with the TD 130 and be designed to emulate a magnetic signal. The proxy card 132 can be intended to be placed inside swipe slot (e.g., next to magnetic coil 705) of the TD 130. The magnetic slot can be different from a chip contact slot. For example, a synchronization can be implemented in software to align the timing of the magnetic signal to be emulated with the expected timing of the magnetic signal. Card selection instruction from POS can be received first and card emulation instruction subsequently.

For example, system 700 can include and utilize any functionality or components of systems 100 or 500, and vice versa, to provide a setup for testing and validating IC card 154 transactions utilizing magnetic stripe technology. System 700 can include a proxy card 132 having a modified configuration to allow a magnetic coil 705 and a driver 710 to control the data (e.g., transaction details corresponding to a particular IC card 154) generated by swiping the proxy card 132 through the TD 130 magnetic coil 705. The data generated can be transmitted from the TD 130 (e.g., driver 710), via a cable 505 to a storage device 225. Storage device 225 can include files, data or instructions corresponding to a plurality of IC cards 154 for the purposes of testing the magnetic stripe transactions. Storage device 225 can include a MUX or any other functionality for selecting a particular file, data or instruction set at a particular memory location of the storage device 225, corresponding to the particular IC card 154 being tested. Using the file, data or instruction set of the particular IC card 154 at the storage data 225, the storage data 225 can provide particular response data to the TD 130. Response data can include data or instructions implementing or validating the requested magnetic stripe transaction. TD 130, or any other component of system 700, can utilize the received response data to process or complete the requested magnetic stripe transaction. Utilizing the magnetic coil 705 and driver 710 to facilitate the magnetic stripe test transactions, system 700 can efficiently and quickly test and validate any number of IC cards 154 representations according to their corresponding data or files stored in the storage device 225.

Figure 8:
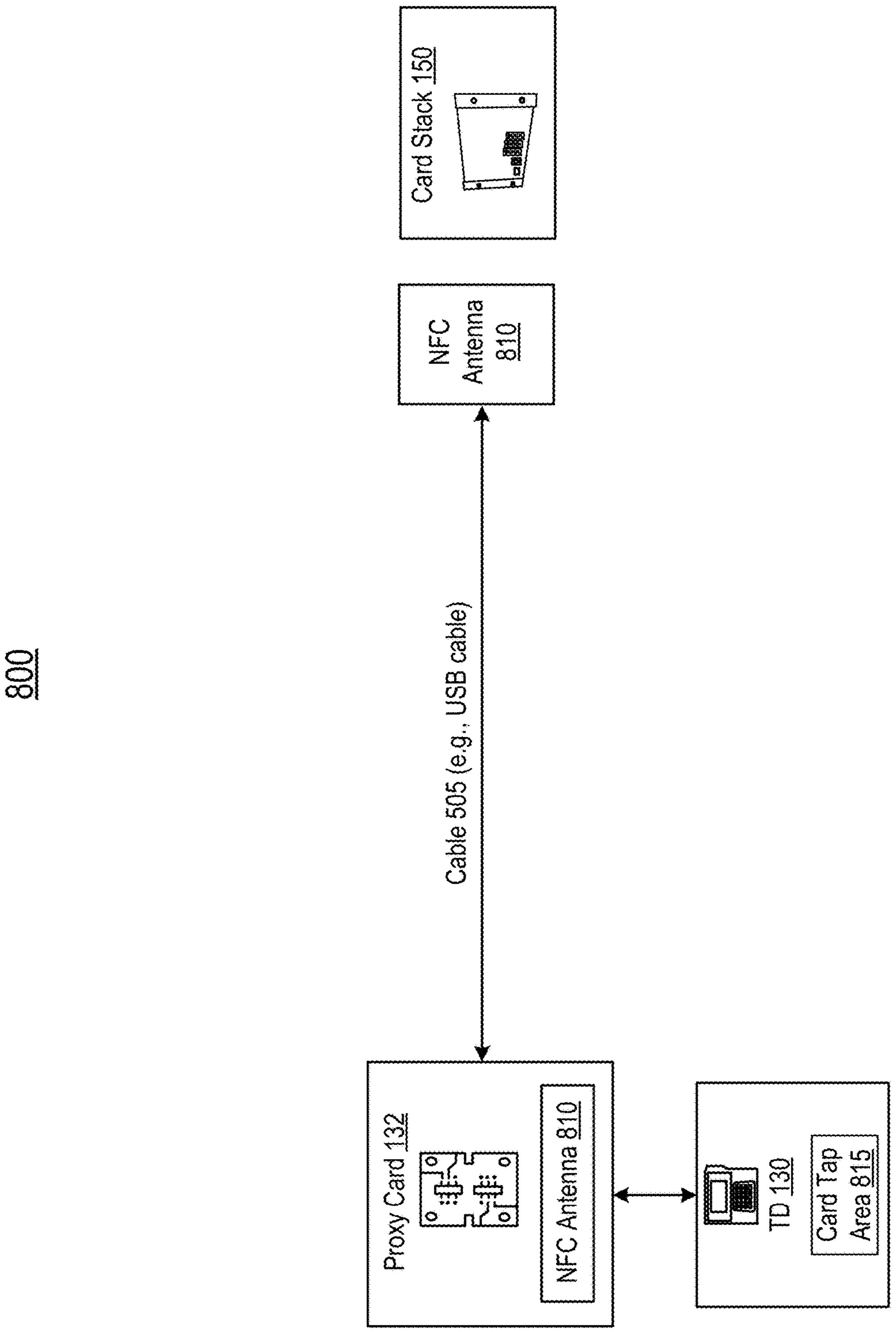
FIG. 8 illustrates an example of a system for an NFC (wireless) card test automation and validation using a pair of NFC antenna acting as NFC signal extender (e.g., one being a part of a proxy card and another embedded in card stack near physical card), and card stack or a card multiplexer.

FIG. 8 illustrates an example of a system 800 for an NFC (wireless) card test automation and validation using NFC antennas 810 and a card stack 150. System 800 can include a TD 130 having a card tap area 815 for wirelessly communicating with an NFC functionality of a proxy card 132 or an IC card 154. TD 130 can include or be communicatively coupled with an NFC antenna 810 for providing wireless communication with the proxy card 132 or IC card 154. TD 130 and/or NFC antenna 810 can be communicatively coupled with a remote NFC antenna 810 that is coupled with a card stack 150 via a cable 505. NFC antenna 810 of the TD 130 can allow the TD 130 to wirelessly communicate with a proxy card 132 and/or IC card 154. One or more NFC antennas 810 of a card stack 150 can allow the one or more IC cards 154 inside of the card stack 150 to be communicatively coupled with the TD 130 via the cable 505. NFC antenna 810 can be a part of proxy card 132. For example, a single proxy card 132 with antenna 810 can be communicate with a TD 130, such as via a card tap area 815. For example, TD 130 can communicate with a card stack 150 via a card tap area 815 wirelessly communicating with the NFC antenna 810 of the proxy card 132 and further from the proxy card 132 via a cable 505 to another NFC antenna 810 coupled with, connected to or integrated with the card stack 150.

Card tap area 815 can include any area on a TD 130 next to which, within which, or within whose vicinity, a physical card (e.g., IC card 154 or proxy card 132) with the NFC functionality can be placed. For example, a card tap area 815 can include a volumetric space of about up to 5 centimeters, 10 centimeters or 20 centimeters within which the IC card 154 or proxy card 132 can be placed to enable a wireless communication with NFC antenna 810 of the TD 130. Card tap area 815 can include one or more antennas and/or transceivers for receiving and transmitting wireless signals to and from NFC antennas 810. TD 130

NFC antenna 810 can include any antenna suitable for NFC wireless communication (e.g., wireless communication with a range of up to 10 or 20 centimeters) with the TD 130. NFC antenna 810 can include a circuitry or device for processing, generating or receiving wireless communication. In some embodiments, NFC antenna 810 can include the functionality for providing, implementing or facilitating any wireless communication, including a Bluetooth communication or Wi-Fi communication. Circuitry or device can include signal amplification, filtering, modulating or demodulating circuitry, as well as circuitry for interfacing with the TD 130 and/or IC cards 154 at the card stack 150.

For example, system 800 can include any functionalities or features of a system 100, 500 or 700, and vice versa. System 800 can include an NFC antenna 810 placed near a physical IC card 154 or proxy card 132 inside a card stack 150 permanently. System 800 can include a second NFC antenna 810 placed on within or next to a TD 130 defined with symbol for wireless card placement, which can denote a card tap area 815. Proxy card 132 can be used to enable or allow for the transaction to take place via a particular IC card 154 at the card stack 150. The pair of NFC antennas 810 can act as a wireless signal extender, extending wireless capability of physical IC card 154 in card stack 150 to the Terminal device 130. Selection of an IC card 154 at the card stack 150 can be done using a similar or a same technique as the one described in connection with contact based IC card 154 transaction processing via a microcontroller 140. Multiplexing circuit for contactless IC card 154 transaction processing can be included in the multiplexing circuit (e.g., at the card stack 150) to allow selection of the IC card 154 based on the transaction data (e.g., from the NFC transaction).

Figure 9:
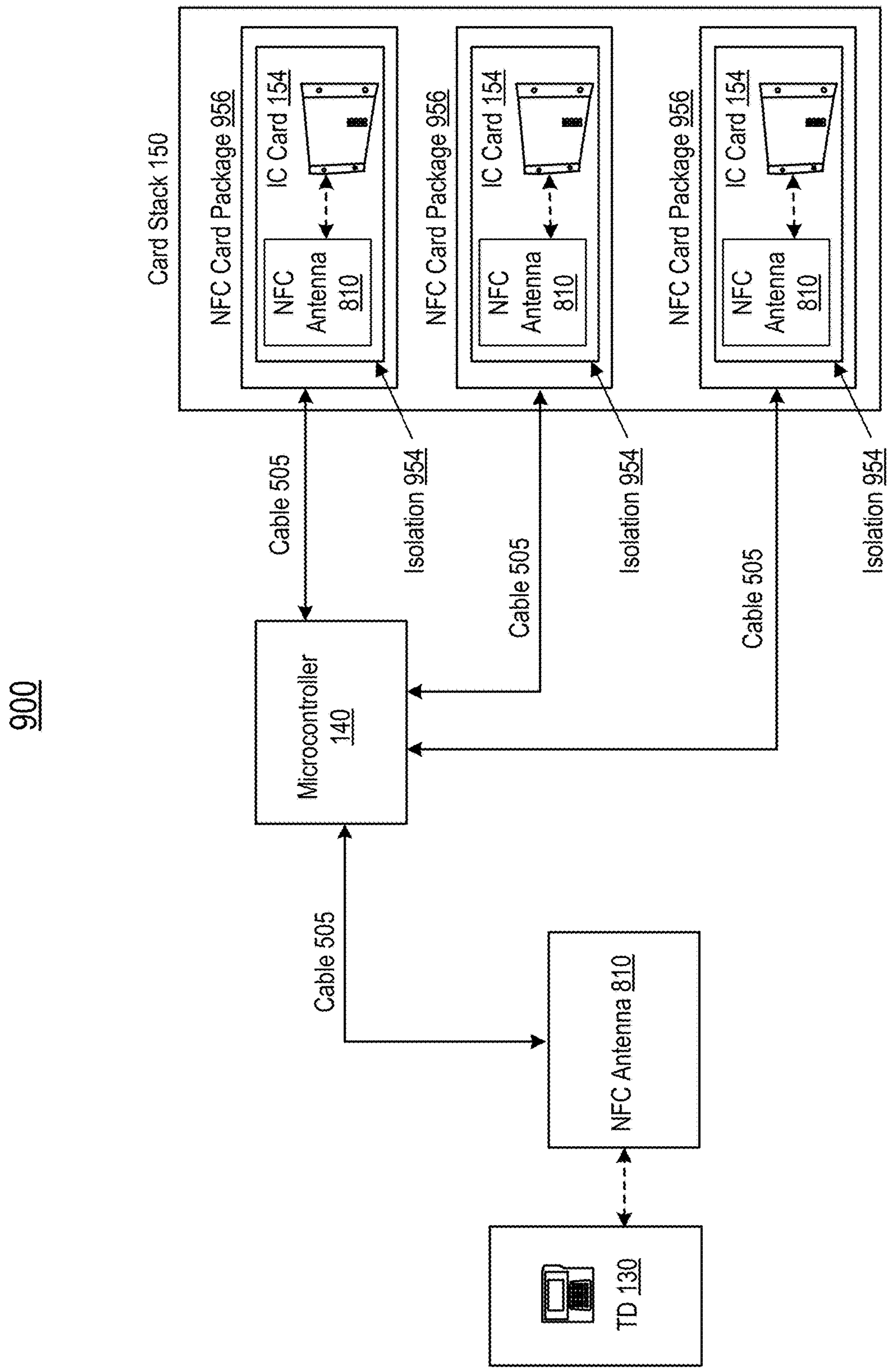
FIG. 9 illustrates example of a system for an NFC (wireless) card test automation or validation using an array of isolated NFC antenna and IC card pairs

FIG. 9 illustrates example of a system 900 for an NFC (wireless) card test automation or validation using an array of isolated NFC antenna and IC card pairs. System 900 can include any functionality or components of systems 100, 500, 700 or 800, and vice versa. A MC 140 can be connected to a TD 130 and its NFC antenna 810 via a cable 505. MC 140 can also be connected with any number of individual NFC card packages 956 at the card stack 150. Each card package 956 can include an NFC antenna 810 wirelessly coupled with an IC card 154 and enclosed within an isolation 954.

An NFC card package 956 can include any package, system or component comprising a pair of an NFC antenna 810 and a corresponding IC card 154. NFC antenna 810 can be wirelessly coupled and wirelessly communicate with an IC card 154. The NFC antenna 810 and its corresponding IC card 154 can be enclosed within an isolation 954. Isolation 954 can include any shielding enclosure blocking wireless interference or crosstalk between two NFC card packages 956, such as aluminum or tin foil or enclosure encapsulating the NFC antenna 810 and the IC card 154 pair. In some examples, card package can be removed when antenna selected does not cause interference to adjacent card package. For example, if interference is below a predetermined interference threshold, aluminum foil may be removed or not used.

System 900 can utilize the MC 140 to act as a MUX for selecting the particular NFC card packages 956 based on the transaction data generated by, or received from, the TD 130. MC 140 can be coupled with each of the NFC card packages 956 via a dedicated cable 505 for each NFC card package 956. As such, system 900 can test NFC wireless communication between the TD 130 and a physical card (e.g., proxy card 132 and/or IC card 154) at the TD 130 end, as well as test NFC wireless communication between NFC antenna 810 and an IC card 154 at the card stack 150. Utilizing the MC 140 to facilitate the NFC wireless transactions and act as a multiplexer and selector of the IC cards 154, system 900 can efficiently and quickly test and validate any number of IC cards 154 for their NFC transactions.

Figure 10:
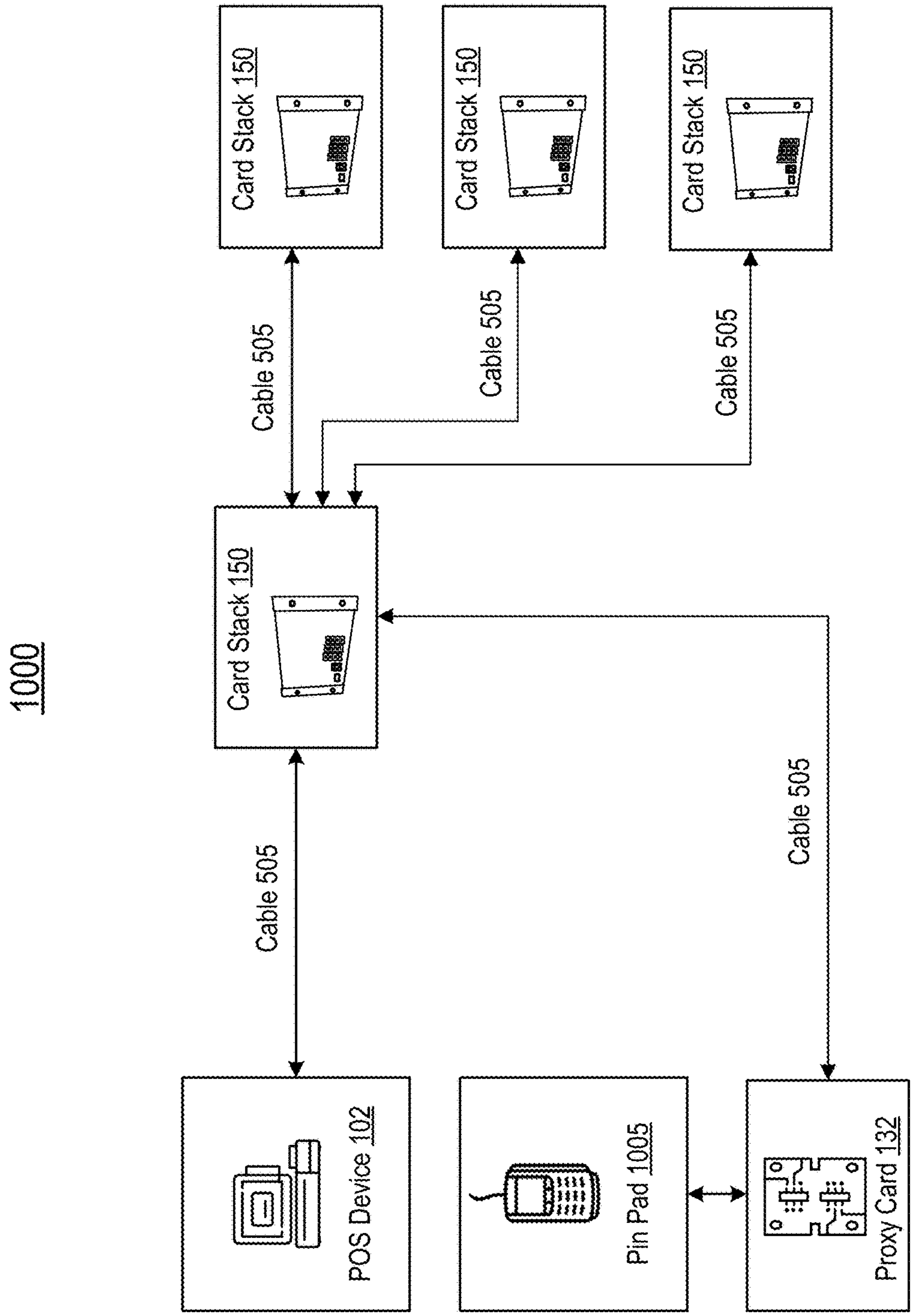
( FIG. 10 illustrates an example of a system for a card test automation using multiple interconnected card stacks.

FIG. 10 illustrates an example of a system 1000 for a card test automation using multiple interconnected card stacks. System 1000 can include any components of other example systems 100, 500, 700, 800, 900 and vice versa. System 1000 can include a POS device 102 coupled, via a cable 505 (e.g., a USB cable), with a card stack 150. System 1000 can include a pin pad 1005 wirelessly (e.g., NFC communication) coupled with a proxy card 132 and coupled with a card stack 150 via another cable 505 (e.g., a data cable). Card stack 150 can include or be communicatively coupled with any number of other card stacks 150 via any number of cables 505. For example, a card stack 150 coupled with the POS device 102 and pin pad 1005 can be a master card stack 150, while cards stacks 150 coupled with the master card stack 150 can be slave card stacks 150. In this example configuration, a system 1000 can include any number of card stacks 150 into a test or a validation system to test any number of IC cards 154 for any transaction interface functionality (e.g., magnetic stripe functionality, a contact chip functionality or an NFC wireless functionality). In one example, there can be a separate slave card stack for NFC based card test automation, so contact based card stack can be different from contactless card stack.

Figure 11:
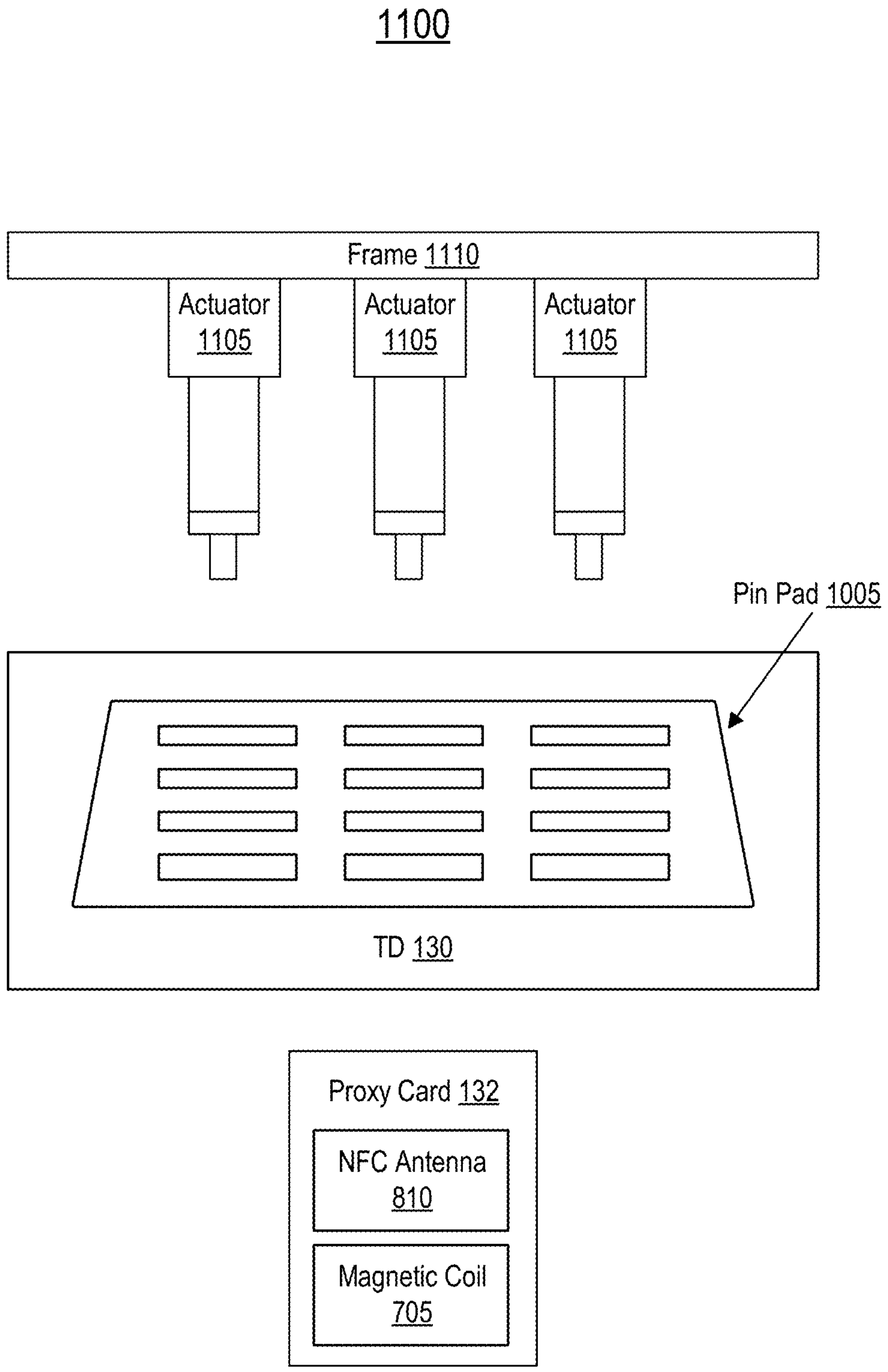
FIG. 11 illustrates an example of a system for a card test automation and validation utilizing a pin pad interfaced with actuators mounted to a frame.

FIG. 11 illustrates an example of a system 1100 for a card test automation and validation utilizing a pin pad 1005 interfaced with actuators 1105 mounted to a frame. System 1100 can include any functionality of other example systems herein (e.g., 100, 500, 700, 800, 900 and 1000) and vice versa. A TD 130 can include or be coupled with a pin pad 1005. TD 130 can be in a contactless (e.g., wireless) communication with a proxy card 132, which can include a magnetic coil 705 and/or an NFC antenna 810. A pin pad 1005 can include numerical buttons to allow the user to input a pin code to access the IC card 154 functionality (e.g., transactions, account etc.). System 1100 can include one or more actuators 1105 for pressing onto, or otherwise activating, numerical buttons of the pin pad 1005 in order to enter the pin codes of the IC cards 154 being tested. One or more actuators 1105 can be coupled with (e.g., attached or supported by) a frame 1110. Frame 1110 can include a metal frame providing a structure from which the actuators 1105 can press onto the numerical buttons of the pin pad 1005 of the TD 130. Actuators 1105 and the frame 1110 can be utilized to automate pin code entry associated with IC cards 154 being tested in combination with any interface transaction functionality testing (e.g., contact chip, magnetic stripe or NFC wireless transactions).

For example, a proxy card 132 can be swiped by a user through a magnetic transaction slot at the TD 130 and the magnetic coil 705 at the proxy card 132 can cause, create or produce an electromagnetic signal indicative of, or corresponding to, the transaction to be processed by the system. For example, a proxy card 132 can be placed by a user next to (e.g., touch or placed within 5 or 10 centimeters) from the card tap area 815 of the TD 130 to allow for a wireless NFC communication to take place for the transaction to be implemented by the system. The system can utilize the actuators 1105 attached to the frame 1110 to enter the pin corresponding to the remote IC card 154 being tested (or its corresponding file stored in the memory of the storage device 225). The system can utilize the pin in combination with the transaction transmission, provided via the NFC wireless communication or the magnetic coil, to complete the synthetic transaction.

Figure 12:
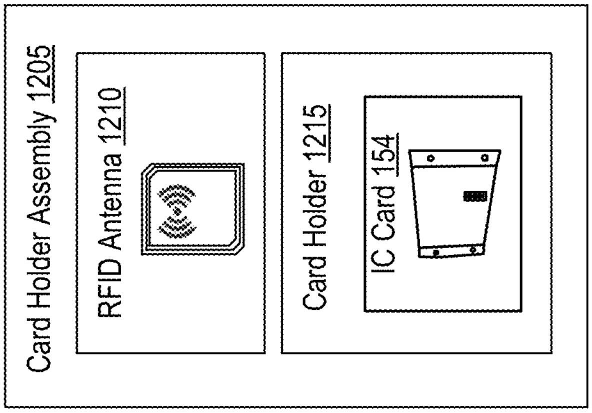
FIG. 12 illustrates an example system using a card holder assembly that can include an RFID antenna attached to a card holder.

FIG. 12 illustrates an example system 1200 having a card holder assembly 1205 that can include an RFID antenna 1210 attached to, coupled with, or assembled with a card holder 1215. Card holder can include, be connected to, be coupled with, or hold one or more IC cards 154. Card holder assembly 1205 can be used for testing (e.g., automated testing of synthetic transactions) of any number of IC cards 154. Card holder assembly 1205 can be used, for example, for implementing contactless payments (e.g., via NFC, RFID or any other wireless technology) for one or more IC cards 154. Card holder assembly 1205 can include a structure to hold or support an IC card 154 (e.g., a tap or contactless transaction card) to facilitate a wireless transaction via the attached card and the RFID antenna 1210 coupled with the card.

For example, a card holder assembly 1205 can include a card holder 1215 that is in communicative contact with an IC card 154. Card holder 1215 can include an interface (e.g., USB or cable 505 contact) for communicating with a remote card stack 150, card multiplexer (e.g., 1305), proxy card 132, TD 130, POS 102 or any other device or system discussed herein. Wireless communicative coupling between the RFID antenna 1210 and the IC card 154 can allow the IC card 154 to extend the range of its communication (e.g., transaction processing) to devices on the opposite end of the cable 505 that can be coupled with the card holder assembly 1205 (e.g., card holder 1215).

RFID (radio frequency identification) antenna 1210 can include any wireless communication antenna and/or wireless communication device for performing contactless (e.g., wireless) transactions using a card, such as an IC card 154. RFID antenna 1210 can include an NFC antenna 810 and/or any feature or embodiment of the NFC antenna 810 and vice versa. RFID antenna 1210 can be configured for integration and usage in a debit or a credit card. RFID antenna 1210 can operate in the high-frequency (HF) or ultra-high-frequency (UHF) range and include frequencies, for example, around 13.56 MHz. RFID antenna 1210 can include one or more coils for transmitting or receiving radio waves. RFID antenna 1210 can exchange communication over a distance range of one or more centimeters. RFID antenna 1210 can be configured to emit a radio signal when a card (e.g., IC card 154) is brought within proximity of a TD 130 and communicate (e.g., transmit and receive) any transaction information or data with the TD 130.

Figure 13:
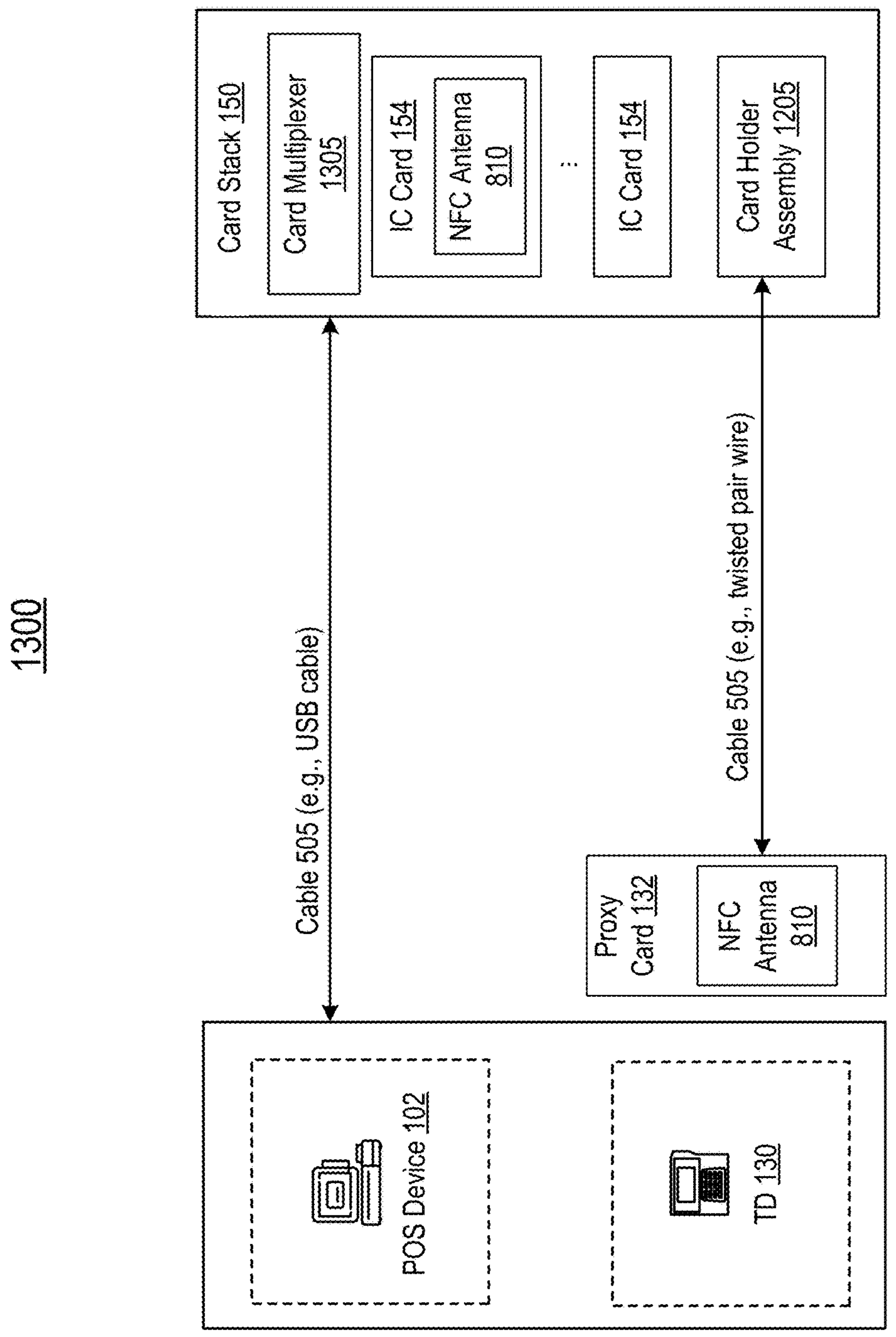
FIG. 13 illustrates an example system in which a point of sale device and a terminal device communicate with a card stack via a cable.

FIG. 13 illustrates an example system 1300 in which a POS device 102 and a TD 130 communicate with a card stack 150 via a cable 505 (e.g., USB cable). Also, a card holder assembly 1205 on the card stack 150 can communicate with a TD 130 via another cable 505 (e.g., twisted pair wire or RF cable) and an NFC antenna 810 of a proxy card 132 wirelessly coupled with the TD 130. Card stack 150 can include a card multiplexer 1305 a card holder assembly 1205 and any number of IC cards 154, each of which can have their own NFC antenna 810. POS device 102 can communicate control information (e.g., instructions or data) via the first cable 505 (e.g., USB cable), while transaction communication via the proxy card 132 can be communicated with the TD 130 via the NFC antenna 810 of the proxy card 132, the second cable 505 (e.g., twisted pair wire or RF cable) and the card holder assembly 1205.

For example, in card automation testing using NFC antenna 810 (e.g., wireless transactions), two NFC antennas 810 and/or RFID antennas 1210 can be utilized for the example system 1300. A first of the two antennas (e.g., 810 or 1210) can be placed, held, fastened or attached at or near (e.g., within one or more centimeters from) a physical IC card 154 inside of a card holder assembly 1205. Card holder assembly 1205 with the first antenna can be placed, fastened or held within the card stack 150, allowing for wireless communication with other IC cards 154 in the card stack 150.

Card multiplexer 1305 can include the functionality to select between different IC cards 154 to test. For example, card multiplexer 1305 can select a first IC card 154 to allow for transaction to be communicated wirelessly between the NFC antenna 810 of the IC card 154 at the card stack 150 and the TD 130 via the NFC antenna 810 of the proxy card 132 (e.g., via the cable 505). Upon completion of the testing of the first IC card 154, card multiplexer 1305 can select a next (e.g., second) IC card 154 to allow for transaction to be communicated wirelessly between the NFC antenna 810 of the second IC card 154 at the card stack 150 and the TD 130 (e.g., via proxy card 132). Card multiplexer 1305 can include the functionality to select any one of the IC cards 154 at the card stack 150 to test, by selecting, for example, either the IC cards 154 or slots 152. Card multiplexer 1305 can operate based on instructions, or responsive to, one or more commands from the MC 140.

A second of the two antennas (e.g., 810 or 1210) can be held, fastened or placed on or near (e.g., within one or more centimeters from) the TD 130 area defined with symbol for wireless card placement (e.g., within the communication range of the NFC transceiver of the TD 130). In this arrangement, the two antennas 810 and/or 1210 can act or perform as wireless signal extenders, allowing for an extended range of the wireless transaction capability between the physical cards (e.g., IC cards 154) within the card stack 150 and the TD 130. This arrangement allows efficient, effective and automated selection of IC cards 154, which can be implemented using slot activator 142 and connection manager 144 of the MC 140. Example system 1300 can utilize a contactless transaction or a tap dummy card (e.g., proxy card 132) held in place by a card holder assembly 1205, which can be assembled or attached to a portion of (e.g., a slot 152) of the card stack 150 and utilized for efficient, expedient and automated testing of IC cards 154 for contactless or tap transactions.

Figure 14:
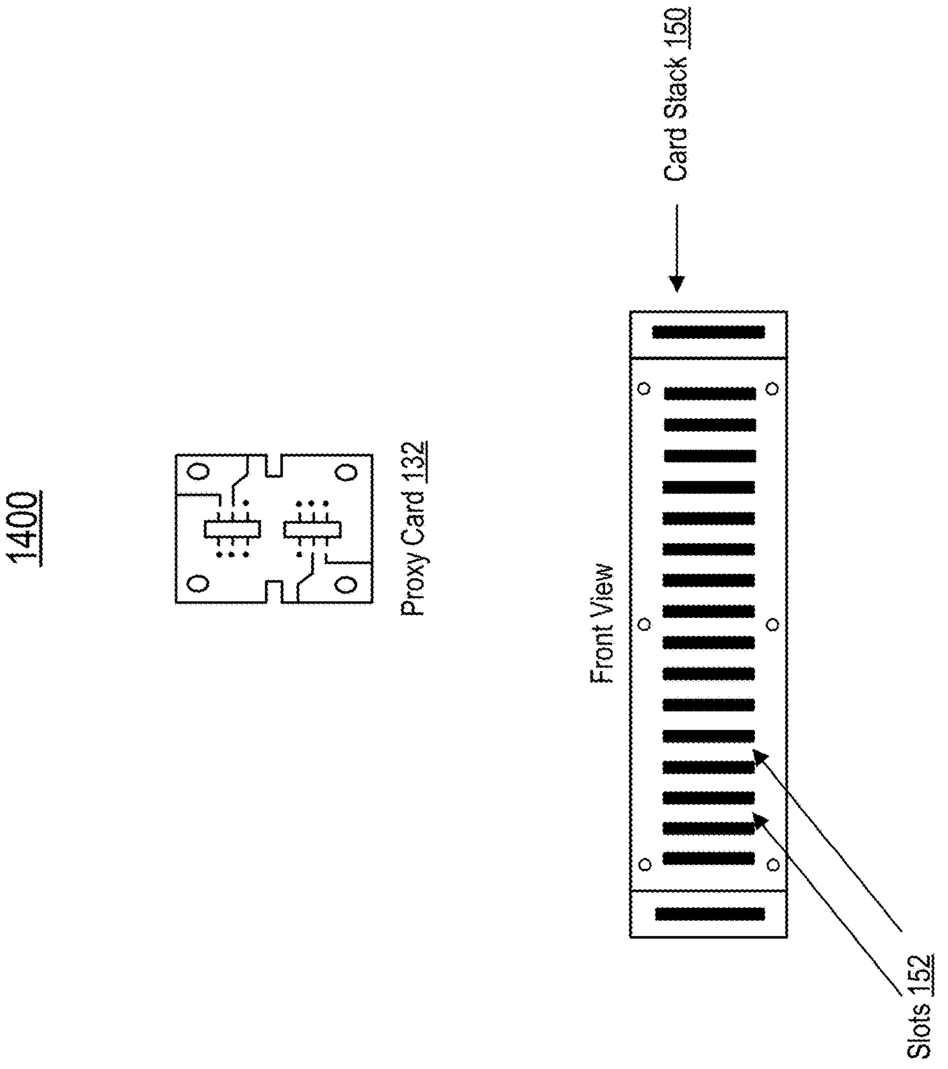
FIG. 14 illustrates an example system that can include a proxy card along with a card stack having slots for magnetic stripe test automation.

FIG. 14 illustrates an example system 1400 that can include a proxy card 132 along with a card stack 150 having slots 152 for magnetic stripe (e.g., swipe card) test automation. Proxy card 132 can be used for testing of transactions at the TD 130 instead of a physical (e.g., IC card 154). For example, proxy card 132 can be inserted or placed in a swipe slot of a payment device (e.g., TD 130), while transactions are implemented via the card.

Figure 15:
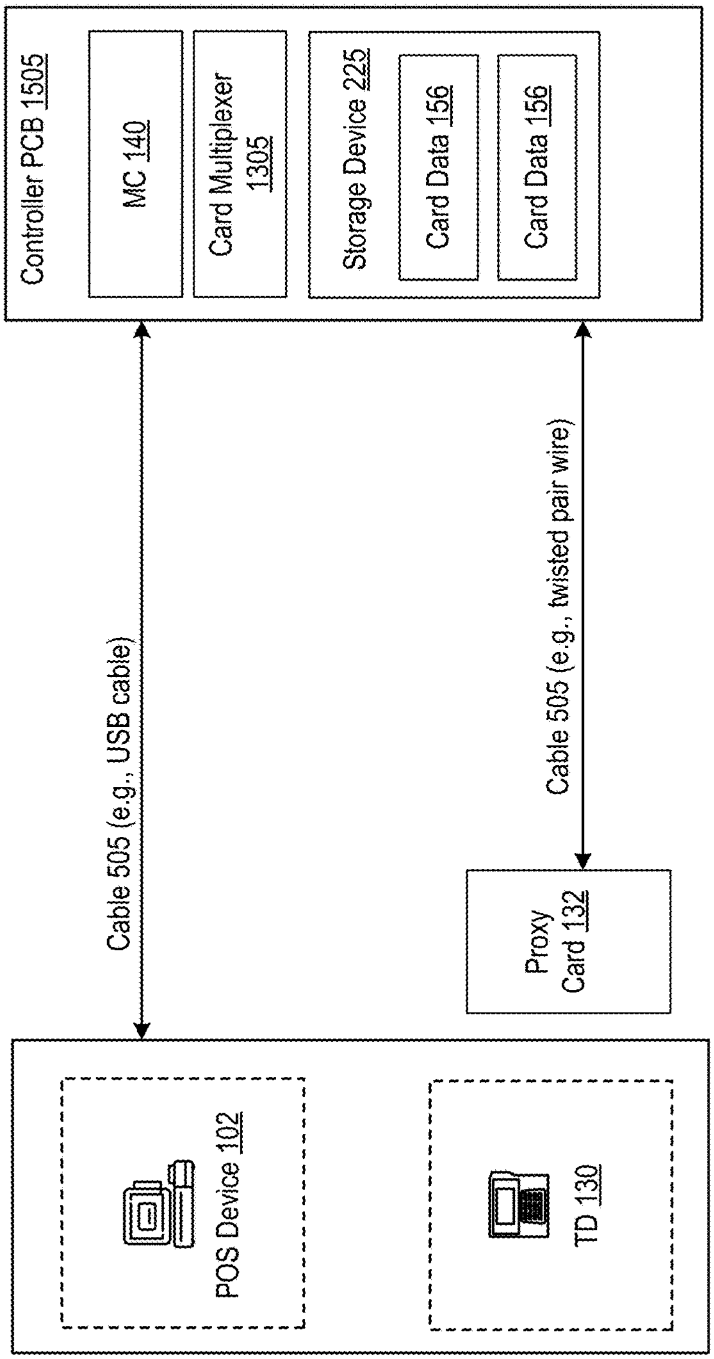
FIG. 15 illustrates an example system that can be used for magnetic stripe (e.g., swipe card) test automation without the use of a physical card.

FIG. 15 illustrates an example system 1500 that can be used for magnetic stripe (e.g., swipe card) test automation without the use of a physical card (e.g., IC card 154). For example, example system 1400 can be used to implement magnetic stripe test automation in which no physical card (e.g., IC card 154) is utilized for test transactions. For example, data of the tested IC cards 154 can be provided or made available in card stack 150 in the form of a file (e.g., card data 156) stored on a storage device 225 (e.g., ROM or any other persistent storage memory) on a controller PCB 1505. In some examples, proxy card can include a magnetic coil PCB.

Controller PCB 1505 can include a printed circuit board (PCB) that can include or integrate a MC 140 and a card multiplexer 1305, which can be configured to facilitate the testing of transactions for various IC cards 154. Example 1500 however can test the IC cards 154 without utilizing any physical IC cards 154. Instead, controller PCB 1505 can utilize a storage device 225 that stores individual card data 156 files, representing distinct IC cards 154, to perform transaction testing using the card data 156 files instead of the physical IC cards 154. Proxy card 132, equipped with an NFC antenna 810, can allow for a wireless coupling with a transaction TD 130, implementing the transactions. In one example, a magnetic coil with driver can be used for swipe card data stored in storage device 255 and an NFC antenna proxy card can be used for tap card automation. In addition, proxy card 132 can be connected to the controller PCB 1505 through a cable 505, allowing the card multiplexer 1305 to utilize the microcontroller 140 capabilities to select specific card data 156 files from the storage device 225. In some examples, the solution can include three different PCBs, one for a controller, one for a mother board and one for a multiplexer circuit to which card holder PCB is attached.

Controller PCB 1505 can include any electronic circuit board equipped with one or more semiconductor or hardware devices, such as a microcontroller 140 and a card multiplexer 1305. Controller PCB 1505 can include interface for coupling with, and using, a MC 140 and/or card multiplexer 1305 on a remote device (e.g., POS device 102 or MC 140 at a remote station). Controller PCB 1505 can be configured to facilitate transaction testing for multiple IC cards 154 (e.g., debit or credit cards) without usage of the physical cards. Controller PCB 1505 can utilize card data 156 that can include or represent any data that an IC card 154 can utilize for a transaction. Controller PCB 1505 can be coupled with a POS 102 with one cable 505, while another cable 505 can couple the controller PCB 1505 and/or its MC 140 with a proxy card 132 that can utilize its NFC antenna 810 to wirelessly communicate transaction data with the TD 130.

Proxy card 132 can include a coil to generate magnetic signal, which can be inserted with the swipe slot of the TD 130 to facilitate the testing of the IC cards 154 via their corresponding card data 156 files on the storage device 225. Card data 156 files on the storage memory 225 of Controller PCB 1505 along with the proxy card 132 can emulate the magnetic signal for the transaction. The proxy card 132 can be placed inside swipe slot of terminal device (e.g., different from chip contact slot) and in there a synchronization can be implemented (e.g., via one or more instructions or data from the MC 140) to emulate the timing of the magnetic signal (e.g., being swiped). Accordingly, controller PCB 1505 and/or MC 140 can cause the system 1500 to emulate the magnetic signal (e.g., emulating the signal transmission in accordance with the swiping) although the proxy card 132 is not being swiped at the TD 130. Instead, the proxy card 132 can be placed in swipe slot of payment device and the rate at which the MC 140 controls the transmissions can allow the TD 130 to complete the transaction as if the card was being swiped through the swipe slot of the TD 130.

Figure 16:
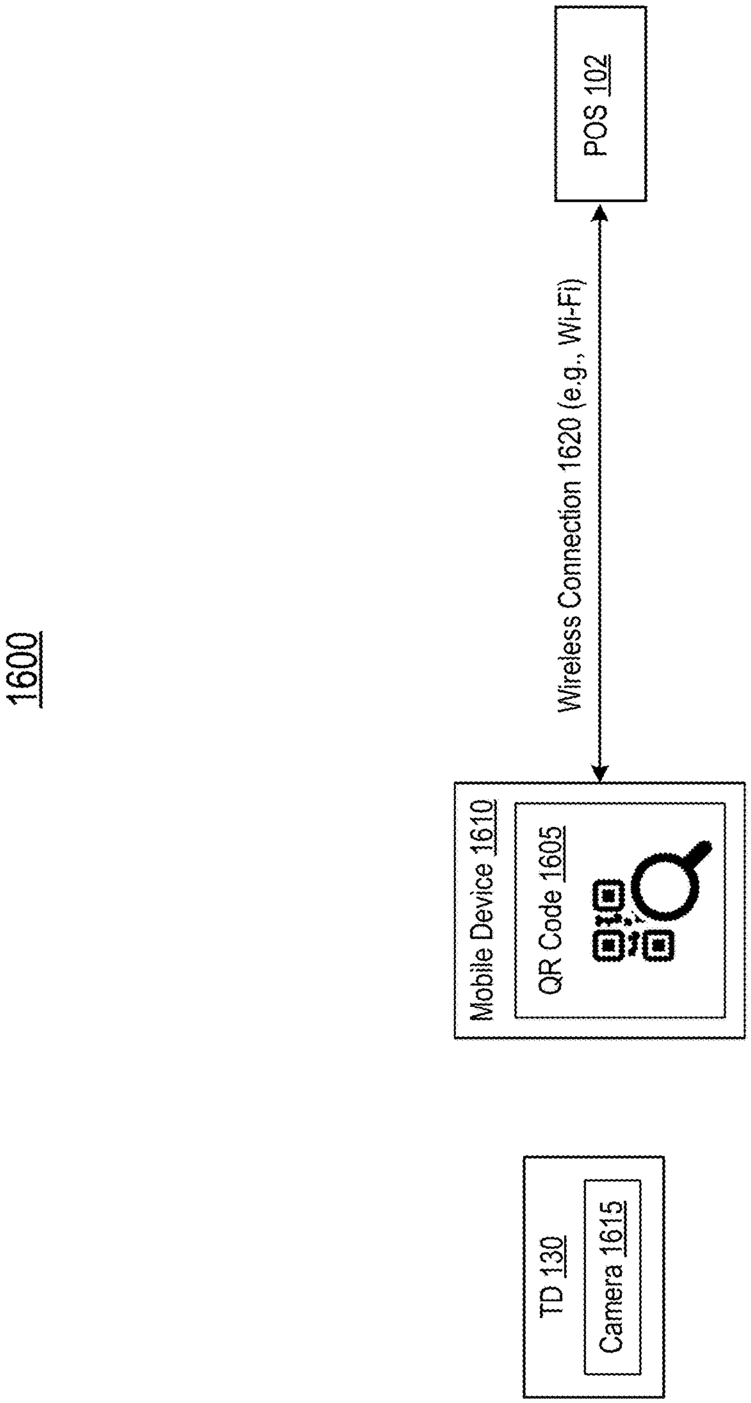
FIG. 16 illustrates an example system that can be used for testing of transactions that utilize a quick response (QR) code for conducting the transactions.

FIG. 16 illustrates an example system 1600 that can be used for testing of transactions, or implementing transactions (e.g., synthetic or real) that utilize a quick response (QR) code as a medium for conducting the transaction. Example system 1600 can emulate a QR code 1605 that can be displayed by a customer and which a merchant or a customer can scan using a camera 1615 of a TD 130 in order to complete a transaction. QR code 1605 can include, identify or point to encrypted information, such as the recipient's payment details and transaction amount. Once the QR code 1605 is scanned, the merchant's payment application (e.g., on a TD 130 or on POS 102) can communicate with the payment gateway, deducting the specified amount from a linked account or a digital wallet and transferring it to the merchant's account.

QR code 1605 can include any type of a two-dimensional barcode that contains encoded information that can be read by a QR code scanner (e.g., a scanner on a smartphone camera.) QR code 1605 can include data or information for locator, identifier, and/or a website visitor tracking. QR code 1605 can use standardized mode of encoding numeric, alphanumeric, binary and/or kanji. QR code 1605 can include one or more black squares arranged in a square grid and with a white background. The data stored on the QR code 1605 can include website address (e.g., a uniform resource locator or URL), a phone number, or up to 4000 character of text of descriptions and/or data.

The technical solution of system 1600 can store information that QR code 1605 can include in file on hard drive of POS 102. The technical solution can generate QR code 1605 using a mobile device 1610. The QR code 1605 can be scanned by payment application running on POS 102 and trigger the synthetic transaction.

QR code 1605 can be generated by a mobile device 1610. For instance, mobile device 1610 can execute, use or access an application (e.g., a local application or a web application) for generating a QR code 1605. The information used to generate QR code 1605 can be stored in POS 102 hard drive as a file. In some examples, a mobile device 1610 can act as proxy device to generate QR code 1605. Mobile device 1610 can be used for automated or high-volume testing of QR code 1605 or QR code 1605 based payment transaction by storing or including various QR code data (e.g., card data 156) that can be included in a file on POS 1620 hard drive. For example, example system 1600 can include a POS 102 storing all transaction related information (e.g., card data 156 storing, identifying or including QR code data) for performing a payment by a mobile device 1610. QR code 1605 can store the payment information and same information can be passed to the TD's 130 camera using Mobile device 1610 which is connected to POS 102 using a wireless connection 1620 (e.g., a Wi-Fi link or a cellular network connection). For example, software logic (e.g., application) implemented in POS 102 can be used to select between different QR code data (e.g., each QR code data on card data 156 corresponding to its own QR code 1605). In doing so, POS 102 can select the card data 156 corresponding to the specific QR code data without using physical QR code 1605.

System 1600 can utilize one or more QR codes 1605 to store various QR code data (e.g., card data 156). For example, a TD camera 1615 can be configured to scan QR code 1605 generated by the mobile device 1610 and displayed via a display of the mobile device 1610. Mobile device 1610 can communicate the scanned information (e.g., QR code data or QR code 1605) to the POS 102 via a wireless connection 1620. A POS 102 can include the functionality to select, from a plurality of QR code data files (e.g., card data 156 including QR code data, parameters, values or information) encoded in the QR codes 1605, a particular QR code data file to test for a transaction. For example, a synthetic transaction can be triggered by a camera 1615 that can be included on, or coupled with, a TD 130, accessing data indicated by the QR code 1605, and then proceeding with the test. Once the test with respect to one QR code data (e.g., card data 156 with the QR code data or information) is complete, the POS 102 can select the next encoded QR code data file and thereafter proceed iteratively to test all of the QR code data files (e.g., stored in the storage) for all synthetic transactions.

The camera 1615 to scan the QR code can be attached to a CCT terminal. There can be a coordination and communication among CCT, POS 102 and mobile device 1610 for the complete transaction based on QR code payment. Mobile device 1610 can get the text link of QR code from the POS device 102 and generate the QR code from the text link received from POS via a wireless (e.g., Wi-Fi) connection 1620.

Figure 17:
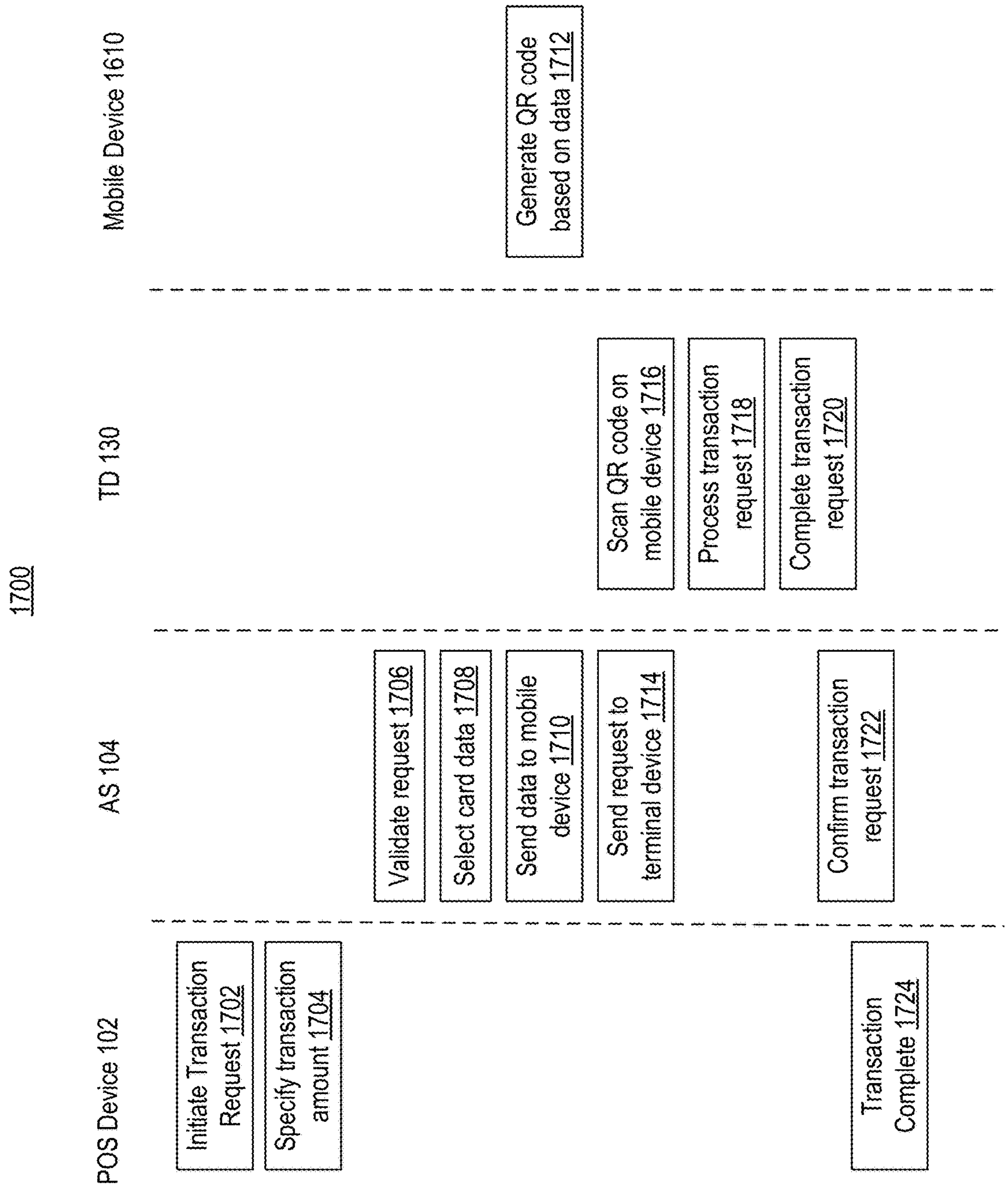
FIG. 17 illustrates an example method of implementing a synthetic transaction at a terminal device using a QR code generated by a mobile device.

FIG. 17 illustrates an example of a method 1700 of automated testing or validating transactions implemented using QR codes 1605. For instance, method 1700 can implement an expedient or automated testing of transactions that utilize QR codes generated by mobile devices. QR code data to be tested can be stored in the form of text link in a file on POS hard drive to allow the solution to generate the QR code to be tested on mobile device and test each of the QR codes (e.g., one by one). The method 1700 can be implemented using, for example, any system examples provided herein, such as examples 100 or 1600, executed using a computing system 200 of FIG. 2. Method 1700 can include ACTS 1702-1724. At ACT 1702, a transaction request can be initiated. At ACT 1704, the transaction amount can be specified. At ACT 1706, a request can be validated. At ACT 1708, a card data can be selected. At ACT 1710, the data can be sent to the mobile device. At ACT 1712, the QR code can be generated based on the data. At ACT 1714, the request can be sent to terminal device. At ACT 1716, the QR code on mobile device can be scanned. At ACT 1718, the transaction request can be processed. At ACT 1720, the transaction request can be completed. At ACT 1722, the transaction request can be confirmed by the automation script. At ACT 1724, transaction can be completed by the POS device.

At ACT 1702, a transaction request can be initiated. For example, a POS device can initiate the transaction request. The transaction request can be a request to initiate testing or validation of one or more transactions using QR code. The request can be a request for an automation script on a POS device. The transaction request can be a request to test a QR code-based payment application (e.g., payment that uses a QR code for transaction completion). The transaction request can be a request to initiate a session with a terminal device. For example, the request can be a request to initiate a synthetic transaction involving a QR code via a session with the terminal device.

At ACT 1704, the POS device can specify the transaction amount. For example, the POS device can identify, indicate or specify any transaction data. Transaction data can include any data related to the synthetic transaction to be implemented, including the transaction amount, type of transaction to complete (e.g., purchase transaction, return transaction or void transaction), technology, customer account, transaction interface to use for completing the transaction (e.g., QR code payment type), a type of a card or device to use for the transaction (e.g., mobile device, or a card having a QR code), or any other transaction data.

At ACT 1706, the automation script can validate the request. Prior to transmitting the request to the terminal device, the automation script can validate the request. The automation script can determine whether a request is a valid request to test a transaction using a QR code. The automation script can read, detect or monitor the information (e.g., transaction data) in the request and can access the information about the IC card to be tested. After validating the request, the request can be sent to the terminal device, via communication interfaces of the point of sale device and the terminal device.

At ACT 1708, the automation script can select the card data. For example, the automation script can select QR code data corresponding to an IC card. The card data can be selected based on transaction data or information in the request. The automation script can select a QR code data or IC card data from a plurality of IC card data stored at a storage device of a POS device, or a plurality of IC cards at the card stack. The automation script can select the IC card data based on, or according to, the transaction data from the request. For example, the automation script can identify or select the specific IC card to test or validate according to the customer information (e.g., account number of data, transaction amount, unique identifier pertaining to the customer or the transaction, or any other information or data discussed herein).

At ACT 1710, the automation script can send data (e.g., via POS device) to the mobile device. The data sent to the mobile device can include any information or data included in, or corresponding to, the QR card data. For instance, the data can include information (e.g., identifier, parameter or value) of a customer, customer account for processing the transaction, transaction data and information on the type of transaction). The data can be transmitted from the POS device via a wireless network, such as any combination of a cellular network, Bluetooth or Wi-Fi.

At ACT 1712, the mobile device can generate the QR code based on the data received from the automation script. For example, the mobile device can receive the data about the transaction or the customer from the automation script, via the POS device at ACT 1710. The mobile device can utilize an application (e.g., a local mobile application or a web-based application) and generate a QR code based on the data. For example, the mobile device can generate the QR code using an information, identifier, parameter, or value from the data received at ACT 1710. For example, the mobile device can determine, identify or access a page, a file or a value to use for generating an QR code, using or based on the data received at ACT 1710.

At ACT 1714, the automation script can send the request to terminal device. The request can be a request to process the synthetic transaction. The request can identify the transaction type, such as a QR code based transaction to be implemented. The request can include transaction data that can be used to facilitate the synthetic transaction. The request can be sent to the terminal device via the POS device, such as wirelessly (e.g., any combination of cellular network, Wi-Fi, Bluetooth or any other wired or wireless communication).

At ACT 1716, terminal device can scan the QR code from the mobile device. For example, the mobile device can display the QR code generated at ACT 1712 and the camera of the terminal device can scan the QR code from the display of the mobile device. Terminal device can scan the QR code using a camera integrated (e.g., included within) the terminal device or communicatively coupled with the terminal device. Terminal device can use an application to seek, identify and focus the camera onto the QR code displayed on the mobile device in order to scan the QR code.

At ACT 1718, the terminal device can process the transaction request. For instance, the terminal device can process the transaction request received from the automation script at ACT 1714. For example, the terminal device can utilize the QR code and/or its QR data to process the synthetic transaction using the selected QR code data (e.g., card data). The terminal device can make a determination that a particular QR code data (e.g., card data corresponding to the QR code) is to be used for the transaction. In response to this determination, terminal device can process the synthetic transaction.

At ACT 1720, the terminal device can complete the transaction request. For example, the terminal device can communicate with a remote server or a device to finalize the transaction. For example, the terminal device can communicate (e.g., send communications pertaining to the transaction) using the QR code data or information to implement or finalize the transaction. Terminal device can determine that the synthetic transaction has been completed and can issue an indication, via an indicator of the terminal device, that the synthetic transaction has been completed.

At ACT 1722, the automation script can confirm the transaction request. For example, the automation script can confirm that the transaction request has been completed by the terminal device. For example, the transaction request interface to the terminal device can issue or send a transaction confirmation. The interface to the terminal can forward the indication, from the terminal device to the point of sale device, that the synthetic transaction is completed. Automation script can confirm the transaction request from 1714 in response to the received transmission from the terminal device.

At ACT 1724, the point of sale device can determine that the transaction is complete. For instance, the POS device can receive the notification that the transaction is completed from the terminal device. The POS device can receive the notification or confirmation from the automation script that the transaction (e.g., synthetic transaction) has been completed. In response to determination that the current transaction has been completed, the point of sale device can initiate a new transaction request to start testing or validating a next QC code transaction. The point of sale device can initiate or repeat the ACTS 1702-1722 for the next QR code and all subsequent QR codes until all QR code data have been tested and validated.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "point of sale device" "terminal device" "microcontroller" or "card stack" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the system 100) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or computing system 200 can include clients and servers. A client and server are generally remote from each other and typically interact through a communication network (e.g., the network 160). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the TD 130, POS device 102, MC 140 and CS 150 can be a single component, app, or program, or a logic device having one or more processing circuits, or part of one or more servers or separate devices.

Having now described some illustrative implementations, it is apparent that the foregoing is illustrative and not limiting, having been provided by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:

one or more processors coupled with memory to:

identify, from one or more slots corresponding to one or more integrated circuit cards, a slot corresponding to an integrated circuit card of the one or more integrated circuit cards;

validate the slot using a proxy card in communication with one or more devices;

determine, via a circuit of the proxy card, that the integrated circuit card is coupled with the one or more devices;

initiate, via an automation script, a synthetic transaction to be executed using data of the integrated circuit card;

execute, responsive to the determination and via the one or more devices, the synthetic transaction in accordance with the automation script using the data of the integrated circuit card; and determine, responsive to the execution of the synthetic transaction, a validation status of the integrated circuit card.

2. The system of claim 1, wherein the validation status is indicative that the integrated circuit card is valid and wherein the one or more devices include a terminal device in communication with the proxy card and a point of sale device to execute the synthetic transaction.

3. The system of claim 1, the one or more processors to:

receive, via a terminal device of the one or more devices, a signal of the circuit of the proxy card; and determine, in response to the signal, that the integrated circuit card is in communication with the terminal device via a communication that is within a signal communication range of the terminal device, while the integrated circuit card is located outside of the signal communication range of the terminal device.

4. The system of claim 1, the one or more processors to:

establish communication between a terminal device of the one or more devices and the proxy card;

determine, responsive to the communication, that the integrated circuit card is coupled with the terminal device to execute a transaction at the terminal device; and execute, responsive to the determination that the integrated circuit card is coupled with the terminal device, the synthetic transaction instead of the transaction.

5. The system of claim 1, the one or more processors to:

establish a communication session between a point of sale device of the one or more devices and a terminal device of the one or more devices;

transmit, to the terminal device, a request to scan a quick response (QR) code for the synthetic transaction; and receive, from the terminal device, a confirmation of the execution of the synthetic transaction using the QR code.

6. The system of claim 1, the one or more processors to:

activate the slot to allow for a function of the integrated circuit card to communicate a stored file comprising the data for the synthetic transaction;

complete the execution of the synthetic transaction according to the data from the stored file; and deactivate the slot upon completion of the synthetic transaction.

7. The system of claim 1, the one or more processors to:

identify, responsive to the determination, from the data of the integrated circuit, information of an account to use for the execution of the synthetic transaction; and complete the execution of the synthetic transaction using the information of the account.

8. The system of claim 1, wherein the synthetic transaction comprises one of a purchase transaction, a return transaction, or a void transaction and the synthetic transaction is executed using at least one of a magnetic strip technology, chip technology, near-field communication technology or quick response (QR) technology.

9. The system of claim 1, the one or more processors to:

determine, responsive to the execution of the synthetic transaction, a performance of the synthetic transaction corresponding to at least one of a success, an error, or a partial success; and generate, for a display, an indication of the validation of the integrated circuit card.

10. The system of claim 1, the one or more processors to:

determine, responsive to the validation of the integrated circuit card, via the circuit of the proxy card, that a second integrated circuit card of the one or more integrated circuit cards is coupled with a terminal device of the one or more devices;

complete, responsive to the determination that the second integrate circuit card is coupled with the terminal device and via a point of sale device of the one or more devices, a second synthetic transaction using a second data of the second integrated circuit card; and validate, responsive to the completion of the second synthetic transaction, the second integrated circuit card.

11. The system of claim 1, the one or more processors to:

generate an indication for a display on a terminal device of the one or more devices, the indication indicating that the synthetic transaction is completed.

12. A method, comprising:

identifying, by one or more processors coupled with memory, from one or more slots corresponding to one or more integrated circuit cards, a slot corresponding to an integrated circuit card of the one or more integrated circuit cards;

validating, by the one or more processors, the slot using a proxy card in communication with one or more devices;

determining, by the one or more processors via a circuit of the proxy card, that the integrated circuit card is coupled with the one or more devices;

initiating, by the one or more processors, via an automation script, a synthetic transaction to be executed using data of the integrated circuit card;

executing, by the one or more processors responsive to the determination and via the one or more devices, the synthetic transaction in accordance with the automation script using the data of the integrated circuit card; and determining, by the one or more processors responsive to the execution of the synthetic transaction, a validation status of the integrated circuit card.

13. The method of claim 12, wherein the validation status is indicative that the integrated circuit card is valid and wherein the one or more devices include a terminal device in communication with the proxy card and a point of sale device to execute the synthetic transaction.

14. The method of claim 12, comprising:

receiving, by the one or more processors via a terminal device of the one or more devices, a signal of the circuit of the proxy card; and determining, by the one or more processors in response to the signal, that the integrated circuit card is in communication with the terminal device via a communication that is within a signal communication range of the terminal device, while the integrated circuit card is located outside of the signal communication range of the terminal device.

15. The method of claim 12, comprising:

establishing, by the one or more processors, communication between a terminal device of the one or more devices and the proxy card;

determining, by the one or more processors responsive to the communication, that the integrated circuit card is coupled with the terminal device to execute a transaction at the terminal device; and executing, by the one or more processors responsive to the determination that the integrated circuit card is coupled with the terminal device, the synthetic transaction instead of the transaction.

16. The method of claim 12, comprising:

establishing, by the one or more processors, a communication session between a point of sale device of the one or more devices and a terminal device of the one or more devices;

transmitting, by the one or more processors to the terminal device, a request to scan a quick response (QR) code for the synthetic transaction; and receiving, by the one or more processors from the terminal device, a confirmation of the execution of the synthetic transaction using the QR code.

17. The method of claim 12, comprising:

activating, by the one or more processors, the slot to allow for a function of the integrated circuit card to communicate a stored file comprising the data for the synthetic transaction;

completing, by the one or more processors, the execution of the synthetic transaction according to the data from the stored file; and deactivating, by the one or more processors, the slot upon completion of the synthetic transaction.

18. A non-transitory computer readable medium storing processor-executable instructions which, when executed by one or more processors, cause the one or more processors to:

identify, from one or more slots corresponding to one or more integrated circuit cards, a slot corresponding to an integrated circuit card of the one or more integrated circuit cards;

validate the slot using a proxy card in communication with a terminal device of the one or more devices;

determine, via a circuit of the proxy card, that the integrated circuit card is in communication with the terminal device;

initiate, via an automation script, a synthetic transaction to be executed using data of the integrated circuit card;

execute, responsive to the determination and via a point of sale device of the one or more devices, the synthetic transaction in accordance with the automation script using the data of the integrated circuit card; and determine, responsive to the execution of the synthetic transaction, a validation status of the integrated circuit card.

19. The system of claim 1, wherein the automation script is configured to select the integrated circuit card from the one or more integrated circuit cards based on transaction data associated with the synthetic transaction, including at least one of a transaction amount, a transaction type, or an account identifier.

20. The method of claim 12, wherein the automation script is configured to select the integrated circuit card from the one or more integrated circuit cards based on transaction data associated with the synthetic transaction, including at least one of a transaction amount, a transaction type, or an account identifier.

* * * * *